(12) United States Patent
Cioffi et al.

(10) Patent No.: US 7,817,745 B2
(45) Date of Patent: Oct. 19, 2010

(54) TONAL PRECODING

(75) Inventors: John M. Cioffi, Atherton, CA (US);
Wonjong Rhee, Palo Alto, CA (US);
Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 738 days.

(21) Appl. No.: 11/336,666

(22) Filed: Jan. 20, 2006

(65) Prior Publication Data
US 2006/0274825 A1 Dec. 7, 2006

Related U.S. Application Data

(60) Provisional application No. 60/686,751, filed on Jun. 2, 2005, provisional application No. 60/698,113, filed on Jul. 10, 2005.

(51) Int. Cl.
*H04L 25/03* (2006.01)
(52) U.S. Cl. .................... 375/296; 375/260; 375/267
(58) Field of Classification Search ............ 375/260, 375/267, 296
See application file for complete search history.

(56) References Cited

U.S. PATENT DOCUMENTS

| | | | |
|---|---|---|---|
| 4,733,395 A | 3/1988 | Gelbrich et al. | |
| 4,901,319 A | 2/1990 | Ross | |
| 5,023,872 A | 6/1991 | Annamalai | |
| 5,181,198 A | 1/1993 | Lechleider | |
| 5,450,420 A | 9/1995 | An et al. | |
| 5,510,917 A | 4/1996 | Corke et al. | |
| 5,511,119 A | 4/1996 | Lechleider | |
| 5,533,012 A | 7/1996 | Fukasawa et al. | |
| 5,541,955 A | 7/1996 | Jacobsmeyer | |
| 5,901,205 A | 5/1999 | Smith et al. | |
| 6,067,646 A | 5/2000 | Starr | |
| 6,147,963 A | 11/2000 | Walker et al. | |
| 6,240,126 B1 | 5/2001 | Ohashi et al. | |
| 6,272,652 B1 | 8/2001 | Starr | |
| 6,310,909 B1 | 10/2001 | Jones | |
| 6,314,135 B1 * | 11/2001 | Schneider et al. | ........... 375/232 |
| 6,449,288 B1 | 9/2002 | Chari et al. | |
| 6,507,608 B1 | 1/2003 | Norrell | |
| 6,536,001 B1 | 3/2003 | Cai et al. | |

(Continued)

FOREIGN PATENT DOCUMENTS

DE    4444312    2/1996

(Continued)

OTHER PUBLICATIONS

International Search Report, Intl. App. No. PCT/IB2006/000759 (6 pgs).

(Continued)

*Primary Examiner*—Chieh M. Fan
*Assistant Examiner*—Freshteh N Aghdam
(74) *Attorney, Agent, or Firm*—Blakely Sokoloff Taylor & Zafman, LLP

(57) ABSTRACT

A method of precoding data for transmission in a multi-user vectored DSL system using DMT modulation, the method comprising, providing encoded data to a precoder input; adaptively precoding the encoded data to generate precoded data; and providing the precoded data at a precoder output.

28 Claims, 17 Drawing Sheets

U.S. PATENT DOCUMENTS

| | | | |
|---|---|---|---|
| 6,546,509 | B2 | 4/2003 | Starr |
| 6,597,745 | B1 | 7/2003 | Dowling |
| 6,598,188 | B1 | 7/2003 | Locke et al. |
| 6,629,249 | B2 | 9/2003 | Gonzalez |
| 6,751,255 | B1 | 6/2004 | Reuven et al. |
| 6,792,049 | B1 * | 9/2004 | Bao et al. ............... 375/285 |
| 6,940,973 | B1 | 9/2005 | Yeap et al. |
| 2003/0072380 | A1 | 4/2003 | Huang |
| 2003/0086362 | A1 | 5/2003 | Hasegawa et al. |
| 2003/0086514 | A1 | 5/2003 | Ginis et al. |
| 2003/0235245 | A1 | 12/2003 | Erdogan et al. |
| 2004/0086064 | A1 | 5/2004 | Van Acker et al. |
| 2004/0109546 | A1 | 6/2004 | Fishman |
| 2005/0052988 | A1 | 3/2005 | Tsatsanis et al. |
| 2005/0053229 | A1 | 3/2005 | Tsatsanis et al. |
| 2005/0129218 | A1 | 6/2005 | Kimble et al. |
| 2005/0152385 | A1 | 7/2005 | Cioffi |
| 2005/0195892 | A1 | 9/2005 | Ginis et al. |
| 2006/0056305 | A1 | 3/2006 | Oksman et al. |
| 2006/0109779 | A1 | 5/2006 | Shah et al. |
| 2006/0133519 | A1 | 6/2006 | Tsatsanis et al. |
| 2006/0146945 | A1 | 7/2006 | Chow et al. |
| 2009/0207985 | A1 | 8/2009 | Cioffi et al. |

FOREIGN PATENT DOCUMENTS

| | | |
|---|---|---|
| GB | 2315392 | 1/1998 |
| WO | WO-95/31867 | 11/1995 |
| WO | WO-01/35611 | 5/2001 |
| WO | WO-2004027579 | 4/2004 |
| WO | WO-2005094052 | 10/2005 |

OTHER PUBLICATIONS

Written Opinion of the International Searching Authority, International Application No. PCT/IB2006/000759 (7 pgs).

Louveaux et al., "Downstream VDSL Channel Tracking Using Limited Feedback for Crosstalk Precompensated Schemes", IEEE ICASSP; Philadelphia, Pennsylvania; Mar. 2005 (4 pgs).

Ginis et al., "Vectored Transmission for Digital Subscriber Line Systems," IEEE Jour. on Sel. Areas in Communications; vol. 20, No. 5; Jun. 2002 (20 pgs).

Tomlinson, "New Automatic Equaliser Employing Modulo Arithmetic," Electr. Letters; vol. 7, pp. 138-139; Mar. 1971 (2 pgs).

"International Search Report and Written Opinion", PCT Application No. PCT/US2007/013393, (Jan. 4, 2008).

Ginis, George et al., "Vectored Transmission for Digital Subscriber Line Systems", *IEEE Journal*, vol. 20 No. 5, Piscataway, NJ, US., XP-011065493, (Jun. 5, 2002) pp. 1085-1104.

Fischer, Appendix E of "Precoding and Signal Shaping for Digital Transmission," ISBN: 978-0-471-22410-5, Aug. 2002, Wiley-IEEE Press (10 pgs).

Song et al., "Dynamic Spectrum Management for Next-Generation DSL Systems," IEEE Communications Magazine; Oct. 2002; pp. 101-109; XP-002395021. (9 pgs).

Cioffi et al., Dynamic Spectrum Management—A methodology for providing significantly higher broadband capacity to the users. Telektronikk, Apr. 2004 (12 pgs).

Voyan Technology, "Vectoring Techniques for Multi-Line 10MDSL Systems".

Cioffi, John M., "Dynamic Spectrum Management".

Cioffi, John M., "Dynamic Spectrum Management Report".

Cioffi, John M., "Spectrum Management with Advancing DSLs".

Cioffi, John, et al., "Vectored VDSL (99-559)".

Ilani, Ishai, "Crosstalk Cancellation for Multi-Line G.shdsl Systems".

Im, Gi-Hong, et al., "FEXT Cancellation for Multi-Carrier Transmission System", (Apr. 11, 2002).

Cendrillon et al., "Improved Linear Crosstalk Precompensation for DSL," IEEE International Conference on Acoustics, Speech and Signal Processing (ICASSP); Sep. 2004 (4 pgs).

Ginis et al., "A Multi-user Precoding Scheme achieving Crosstalk Cancellation with Application to DSL Systems," Proceedings of the 34th Asilomar Conference; Pacific Grove, California; pp. 1627-1631; Oct. 2000 (5 pgs).

Forouzan et al., "Generalized Iterative Spectrum Balancing and Grouped Vectoring for Maximal Throughput of Digital Subscriber Lines," Globecom 2005; St. Louis, Missouri; Nov. 28-Dec. 2, 2005 (5 pgs).

Cheong et al., "Computationally Efficient Cancellation of Partially-overlapped Crosstalk in Digital Subscriber Lines," Globecom 2005; St. Louis, Missouri; Nov. 28-Dec. 2, 2005 (5 pgs).

Laroia et al., "A Simple and Effective Precoding Scheme for Noise Whitening in Intersymbol Interference Channels," IEEE Trans. on Communication; vol. 41, pp. 1460-1463; Oct. 1993 (4 pgs).

Wei, "Generalized Square and Hexagonal Constellations for Intersymbol-Interference Channels with Generalized Tomlinson-Harashima Precoders," IEEE Transactions on Communications, vol. 42, No. 9, Sep. 1994 (9 pgs).

Harashima et al., "Matched-transmission technique for channels with intersymbol interference," IEEE Transactions on Communication.; vol. COM-20, No. 4; pp. 774-780, Aug. 1972 (7 pgs).

"International Search Report", International Application No. PCT/IB2006/000499, 4 pgs.

"Written Opinion of the International Searching Authority", International Application No. PCT/IB2006/000499, 6 pgs.

Cendrillon, Raphael, et al., "Partial Crosstalk Cancellation Exploiting Line and Tone Selection in VDSL".

Cendrillon, et al., "Partial Crosstalk Cancellation for Upstream VDSL", EURASIP Journal on Applied Signal Processing, (Oct. 2004), 16 pgs.

Cendrillon, et al., "Partial Crosstalk Precompensation for Downstream VDSL", Published by Elsevier North-Holland, Inc.; vol. 84 issue 11; ISSN:0165-1684, (Nov. 2004), 15 pgs.

Cendrillon, et al., "The Linear Zero-Forcing Crosstalk Canceller is Near-optimal in DSL Channels", IEEE Global Communications Conference (Globalcom); Dallas; Texas. (Dec. 2004), 5 pgs.

Cioffi, John , et al., "MIMO Channel Measurement Test Plan", (Feb. 17, 2003).

Cioffi, John, "The Fast Adaptive Rotor's RLS Algorithm", IEEE Transactions on Acoustics, Speech and Signal Processing, New York, NY, US vol. 38, No. 4, (Apr. 1, 1990), pp. 631-653.

Cuypers, et al., "Combined per tone equalization and receiver windowing in DSL receivers: WiPTEQ", Elsevier Science Publishers, Amsterdam, NL, vol. 85, No. 10, (Oct. 2005), pp. 1921-1942.

Cuypers, et al., "Combining Per Tone equalization and windowing in DMT receivers", IEEE International Conference on Acoustics, Speech and Signal Processing (ICASSP); Orlando, Florida.

Fang, Jeannie L., "Modeling and Characterization of Copper Access Systems", (May 31, 2002).

Lee, et al., "Binder MIMO Channels", submitted to IEEE Journal on Selected Areas in Communications, Reference No. XP-001143167, (Jun. 2002), 20 pgs.

Patent Cooperation Treaty, "International Search Report", International Application No. PCT/IB2006/000482, 4 pgs.

Patent Cooperation Treaty, "Written Opinion of the International Search Authority", International Application No. PCT/IB2005/00482, 7 pgs.

Paul, Clayton R., "Analysis of Multiconductor Transmission Lines", John Wiley & Sons, Chapters 2 and 3, (1994), 46-186.

Starr, et al., "DSL Advances", Chapters 3, 7, and 11; Prentice-Hall, (2003).

Non-Final Office Action for U.S. Appl. No. 11/336,113 Mailed Nov. 12, 2008, 23 pages.

"International Search Report", International Application No. PCT/IB2004003961, (Apr. 7, 2005), 4 pgs.

"International Search Report", International Application No. PCT/IB2006/000884, (Sep. 4, 2006), 5 pgs.

"ITU-T "Recommendation G.992.1"", Asymetric digital subscriber line (ADSL) transceivers, Series G, as provided by International Searching Authority, Reference No. XP-002321806, (Jun. 1999), 226-239.

"Written Opinion of the International Search Authority", International Application No. PCT/IB2004003961, (Apr. 7, 2005), 6 pgs.

"Written Opinion of the International Searching Authority", International Application No. PCT/IB2006/000884, (Dec. 2, 2007), 6 pgs.

Cendrillon, Raphael, et al., "Improved Linear Crosstalk Precompensation for DSL", (May 2004).

Cendrillon, Raphael, et al., "Partial Crosstalk precompensation in downstream DSL", (Apr. 22, 2004).

Cendrillon, Raphael, et al., "The Linear Zero-Forcing Crosstalk Canceler is Near-optimal in DSL Channels".

Cioffi, John M., et al., "Canonical Packet Transmission on the ISI Channel with Guassian Noise", Global Telecommunications Conference; London, UK. XP-010220148, (Nov. 18, 1996), 1405-1410.

Cioffi, John, "Dynamic Spectrum Management", Alcatel DSL Forum presentation; Paris, France, (Nov. 11, 2003).

Cioffi, John, "Dynamic Spectrum Management", Deutsche Telecom DSL presentation; Darmstadt, Germany., (Oct. 6, 2003).

Cioffi, John, "Dynamic Spectrum Management", IEEE Globalcom presentation; San Francisco, California., (Dec. 3, 2003).

Cioffi, John, "Dynamic Spectrum Management", Telecom Italia presentation; Turin, Italy, (Nov. 19, 2003).

Cioffi, John, "Dynamic Spectrum Management", Korea Telecom DSL presentation; Seoul, Korea, (Sep. 24, 2003).

Cioffi, John, et al., "Low-Latency Impulse Elimination", Committee T1, Working Group T1E1.4 (DSL Access); Atlanta GA, (Apr. 8, 2002).

European Patent Office, "Examination Report", European Application No. 07795837.9, (Apr. 1, 2009).

European Patent Office, "First Office Action", European Application No. 04801294.2, (Jun. 27, 2008), Whole Document.

Ginis, George, et al., "Alien Crosstalk Cancellation for Multipair Digital Subscriber Line Systems", vol. 2006 Article ID 16828, (2006).

Ginis, George, et al., "Blind adaptive MIMO decision feedback equalization using givens rotations", IEEE International Conference on Communications, New York, NY, US, vol. 1 of 5., (Apr. 28, 2002), pp. 59-63.

Moulin, F., et al., "Discrete-multitone-based ADSL and VDSL systems performance analysis in an impulse noise environment", IEEE Proceedings: Sci Meas. Technol. vol. 150 No. 6, Reference No. XP-006024286, (Nov. 3, 2003), 273-78.

Nedev, N., et al., "Comparison between Interleaving and Multiple DMT Symbols per Respectfully Submits Codeword in ADSL Systems", Globalcom 2002—IEEE Global Telecommunications Conference; Taipei, Taiwan, Reference No. XP-010636152, (Nov. 17, 2002), 2265-69.

Song, Kee Bong, et al., "Dynamic Spectrum Management for Next-Generation DSL Systems", IEEE Communications Magazine; Reference No. XP-001132769, (Oct. 2002), 9 pgs.

Starr, et al., "Information comment solicitation on ITU FEC INP submission for ADSL2", Committee T1, Working group T1E1.4 (DSL Access); Vancouver, BC, (Feb. 23, 2004).

Starr, et al., "Proposed revisions to G.992.4 and G.992.3&5 regarding impulse noise protection", Study group 15, ITU—Telecommunication Standardization Sector; San Francisco, California, (Mar. 8, 2004).

Veithen, D, et al., "A 70Mb/s Variable-Rate DMT-Based Modem for VDSL", 1999 IEEE International Solid-State Circuits Conference; ISSCC99/Session 14/Paper TP 14.6., Reference No. XP-002184687, (Feb. 15, 1999), 248-249.

Non-Final Office Action for U.S. Appl. No. 11/336,113, Mailed Jan. 4, 2010, 13 pages.

1st OA for CN200780021083.0 mailed Apr. 1, 2010 6 pages.

Final Office Action for U.S. Appl. No. 11/336,113 dated Jun. 24, 2009; 17 pages.

* cited by examiner

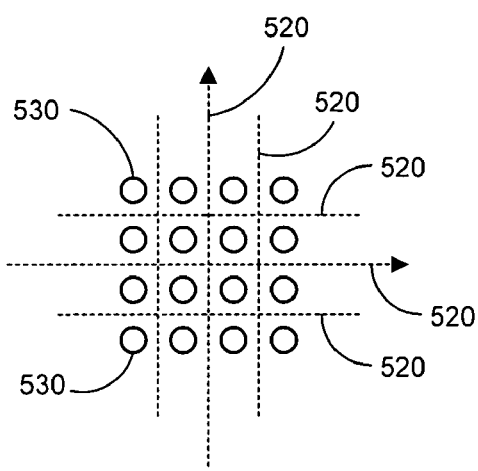
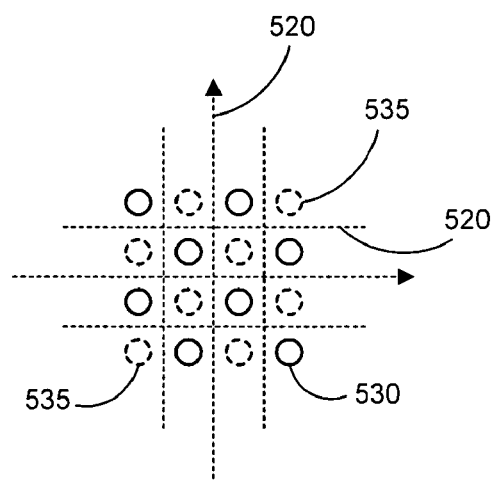
FIGURE 5A  FIGURE 5B
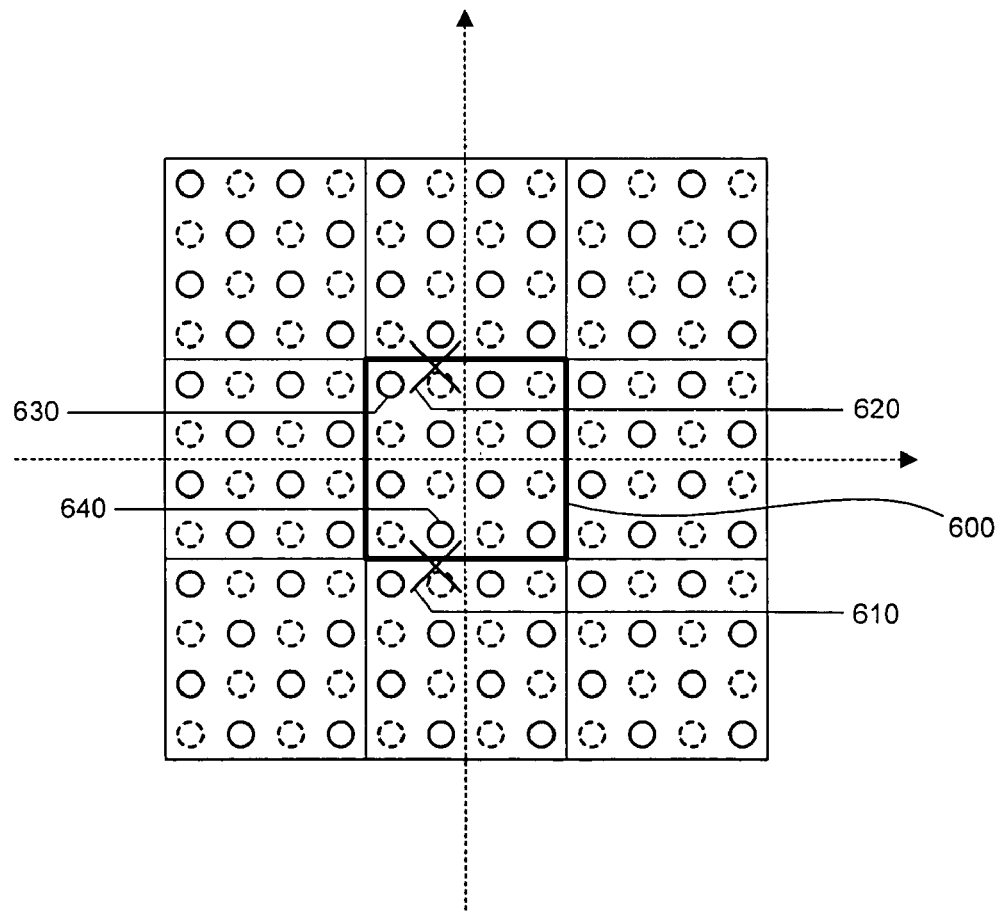
FIGURE 6

TONAL PRECODING

CROSS-REFERENCE TO RELATED APPLICATIONS

This application claims the benefit of priority under 35 U.S.C. §119(e) of the following:

U.S. Provisional No. 60/686,751 filed on Jun. 2, 2005, entitled TONAL PRECODING, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital data transmission and/or communications systems.

2. Description of Related Art

Digital subscriber line (DSL) technologies can provide large bandwidth for digital communication over existing telephone subscriber lines (also referred to as loops and/or the copper plant) and can adjust to the characteristics of a line by using discrete multitone (DMT) line code that assigns a number of bits to each tone (or sub-carrier), adjustable to channel conditions determined during training and initialization (typically by transceivers that are both transmitters and receivers) at each end of the subscriber line.

In DSL communications systems, significant performance gains can be achieved by reducing the crosstalk that occurs among the twisted pairs, as is well known by those skilled in the art. One such technique for reducing crosstalk is to suppress the far-end crosstalk by jointly processing the signals transmitted and/or received by a group of lines, commonly referred to and described as "vectoring." When vectoring is applied to improve performance in the downstream transmission direction among a group of lines that do not have a common termination point, then joint signal processing can only take place at the transmitter side. This joint signal processing is often described as preceding.

Systems, apparatus, methods and techniques that improve preceding would represent a significant advancement in the art. More specifically, systems, apparatus, methods and techniques for implementing such preceding that are implementation adaptive to changes in the channel and noise, permit dynamic subtraction based on power limitation and utilize modulo operation and dither signal likewise would represent a significant advancement in the art.

BRIEF SUMMARY

Embodiments of the present invention utilize a precoder that will mitigate or remove interference signals (especially crosstalk) among multiple users whose transmitters are interconnected (that is, where a common clock is shared). Such precoding and precoders implementing such preceding can be used in vector downstream (one-sided) situations in communication systems such as ADSL and VDSL, among others.

When U transmitters of U users (one transmitter per user) are interconnected, the channel from the U transmitters to their U receivers can be modeled by a matrix channel H, whose size usually is U×U. The channel H can be decomposed into H=RQ using the well known RQ factorization of a square matrix. As is well known by those skilled in the art, the Q matrix can be used as a linear filter, while the R matrix can be used as a feedback filter for mitigating or removing crosstalk. Embodiments of the present invention provide an efficient implementation of the R matrix in the RQ factorization that characterizes multi-user downstream vector communication channels (such as DMT VDSL one-sided or two-sided transmission channels). Examples are provided using xDSL as an illustrative communication system, but the invention applies to any system where vectored multi-user broadcast precoding can be used.

The G matrix in R=SG (where S is a diagonal scaling matrix that forces the diagonal elements of the triangular G to be all ones) can be interpreted, as is well known in the art, as a set of precoder coefficients for the U users. The SNR (signal to noise ratio) of user u at that user's receiver will be proportional to the precoder coefficient in the $u^{th}$ diagonal element of S. These precoder coefficients can vary with each tone used by each user and depend upon the encoding order of users selected for each tone. In practical systems, the channel H (or the worst-case-noise equivalent channel H) is variable. Embodiments of the present invention update the R and Q matrices to adapt to such variability. Moreover, such updating may be applied using the present invention to compensate for bit-swapping operations for the DSL users, or by users of a vectored system turning on and off.

After the feedback-filter matrix G is applied, the transmit power on one, some or all of the U lines can be significantly increased, thus forcing a scalar power reduction to conform to transmit power constraints and consequently causing a use penalty for the preceding with the matrix G. This may be referred to as the "power-enhancement" problem. Modulo arithmetic can be used to mitigate the power-enhancement problem, and the base of modular arithmetic applied also can vary with each user within a single precoder for a single tone. While use of modulo arithmetic is known in the art, variable modulo arithmetic according to embodiments of the present invention is novel and non-obvious.

Multi-user situations create an unusual situation for precoding in that the modulo arithmetic used for each user can be different, thus imposing a larger power increase. Traditional approaches for single users to offset a power increase and/or allow shaping cannot be used because they require structures in the receivers that are not possible when data transmission and/or communication lines (for example, DSL lines) terminate at different physical locations. Further, digital duplexed or synchronized DMT systems can separately implement a precoder for each tone. The user order of preceding need not be the same on each tone, and the modular arithmetic progression may thus also be different on each tone. Further, the precoding process terminates each DMT symbol, after processing up to U users. An optional dither signal, known to both transmitter and receiver, can be added at the transmit side and removed at the receiver side to smooth the precoding process and ensure that aberrations in the transmitted constellation size and characteristics are consistent despite any unusual variations in the feedback signal that exits the feedback filter matrix G before being subtracted from the user signal of interest.

Some embodiments of the invention are compatible with existing communication standards and use neither dither nor modulo arithmetic (that is, they utilize a "subtraction only" mode). Moreover, a receiving DSL modem need not know that the precoder is present. Other embodiments use the dither signal and/or modulo arithmetic. When dither is used, such dither must be known to a cooperating receiver. When modulo arithmetic is used, the cooperating receiver needs to perform the same modulo operation, though embodiments of the present invention do not require use of identical constellations by both transmitter and receiver. When modulo arithmetic is used, embodiments of the present invention provide novel and nonobvious designs that improve, preceding performance by 0.5 dB for odd-bit constellations.

Some embodiments of the present invention exploit row-dominant downstream crosstalk matrices H (with only differentially coupled terms and no phantom-mode signals). A row-dominant matrix H is one in which the diagonal elements are much larger than any other element in their same respective rows. Such row-dominant H matrices lead to row-dominant R matrices in the RQ factorization. Row dominance occurs when the FEXT transfer from another line into the subject line is much smaller than the insertion loss of the subject line. A column-dominant matrix H is one in which the diagonal elements are much larger than any other element in their same respective columns. Such a matrix has an R in the QR factorization that is also column-dominant. Column dominance occurs when the FEXT transfer from a subject line into another line is much smaller than the insertion loss of the subject line.

Other embodiments assume the H matrix is neither row-dominant nor U×U and conform to situations where phantom-mode signal use or other effects eliminate the row dominance. A particular situation where row dominance often does not apply is when worst-case noise is assumed for the downstream vector broadcast channel. This worst-case noise assumption actually characterizes and allows the highest performance and thus is attractive to capture. Thus, inclusion of worst-case noise effects often leads to a non-diagonal R matrix and so use of a precoder leads to higher performance, a result that has eluded earlier DSL engineers and designers. Failing to recognize the potential improvement from precoding because of the worst-case noise inclusion has discouraged the study and use of precoders in vectored DSL binders. Furthermore, phantom signals and their use also lead to H matrices that are not row dominant (with or without worst-case noise) which also benefit from the use of precoders in the present invention.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which:

FIG. 5A is a standard 4×4 constellation for b=4.

FIG. 5B is a b=3 checkerboard constellation based on FIG. 5A.

FIG. 6 is a template centered at the origin that shows the tessellation of the constellation by the shape of the type in FIG. 5B.

DETAILED DESCRIPTION

Figure 1:
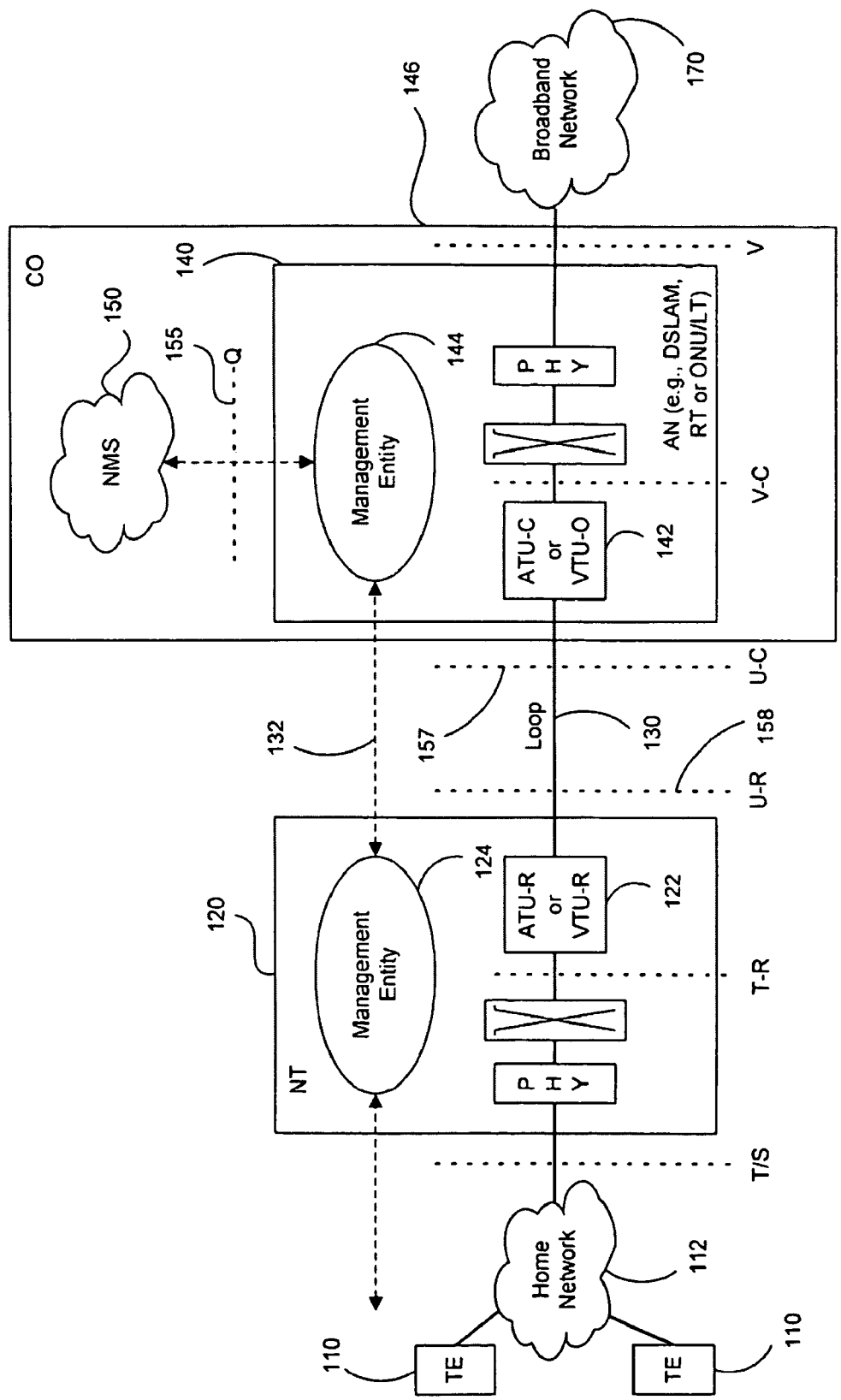
FIG. 1 is a reference model system per the G.997.1 standard applicable to ADSL, VDSL, etc. in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement methods and apparatus that permit precoding of signals to be transmitted in a data transmission and/or communication system. Moreover, the methods and apparatus of the present invention allow implementation of other features that can enhance communication systems such as DSL systems. The system in which embodiments of the present invention may be used may include ADSL lines, VDSL lines and/or any other data transmission and/or communication system components and/or lines with which the present invention is practical, as will be appreciated by those skilled in the art after reading the present disclosure. As used herein, the terms "data transmission system" and "communication system" are intended to extend to any and all systems in which the present invention can be implemented and/or used and are generally intended to be interchangeable.

As described in more detail below, implementation of precoding and precoders according to one or more embodiments of the present invention can be part of a communication device (for example, a controller, DSL optimizer, DSLAM, LT device, RT device, DSL modem and the like). Such implementation may be controlled and/or assisted by a precoding control unit in a local device (again, for example, a modem), in a remote device, such as a controller (for example, in or as a DSL optimizer, dynamic spectrum manager or spectrum management center), and/or in a combination of devices that may be located in different locations, as will be appreciated by those skilled in the art. The precoding control unit can be located anywhere. In some embodiments, a controller having a preceding control unit resides in a DSL CO, while in other cases it may be operated by a third party located outside the CO. The structure, programming and other specific features of a controller and/or precoding control unit usable in connection with embodiments of the present invention will be apparent to those skilled in the art after reviewing the present disclosure.

Precoding mitigates or removes interference signals (especially crosstalk) among multiple users with interconnected transmitters in vectored DSL systems and the like. Efficient implementation is provided of the R matrix in RQ factorization that characterizes multi-user downstream vector channels (such as DMT VDSL one-sided or two-sided transmission channels). A set of precoder coefficients can vary with each tone used by each user and depend upon the encoding order of users selected for each tone. In adaptive operation, the coefficients of the R and Q matrices can be updated when changes occur to the transmission environment. Variable modulo arithmetic mitigates the power-enhancement problem, and the base of modular arithmetic also can vary with each user within a single precoder for a single tone. The user order of precoding need not be the same on each tone, and the modular arithmetic progression may thus also be different on each tone because multi-user situations create an unusual situation for precoding in that the modulo arithmetic used for each user can be different (thus imposing a larger power increase) and because digital duplexed or synchronized DMT systems can separately implement a precoder for each tone. Further, the precoding process terminates each DMT symbol, after processing up to the total number of users. An optional dither signal, known to both transmitter and receiver, can be added at the transmit side and removed at the receiver side to smooth the precoding process and ensure that aberrations in the transmitted constellation size and characteristics are consistent despite any unusual variations in the feedback signal that exits the feedback filter matrix G before being subtracted from the user signal of interest. Some embodiments use a "subtraction only" mode while other embodiments use a dither signal and/or modulo arithmetic, though embodiments of the present invention do not require use of identical constellations by both transmitter and receiver.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM, LT device or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. In some instances, NMS is also referred to as an Element Management System (EMS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2). The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Working Text TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is more common for lines sharing the same binder to terminate on the same line card in VDSL than in ADSL. However, the following discussion of xDSL systems may be extended to ADSL because common termination of same binder lines might also be done (especially in a newer DSLAM that handles both ADSL and VDSL). In a typical topology of a DSL plant, in which a number of transceiver pairs are operating and/or are available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
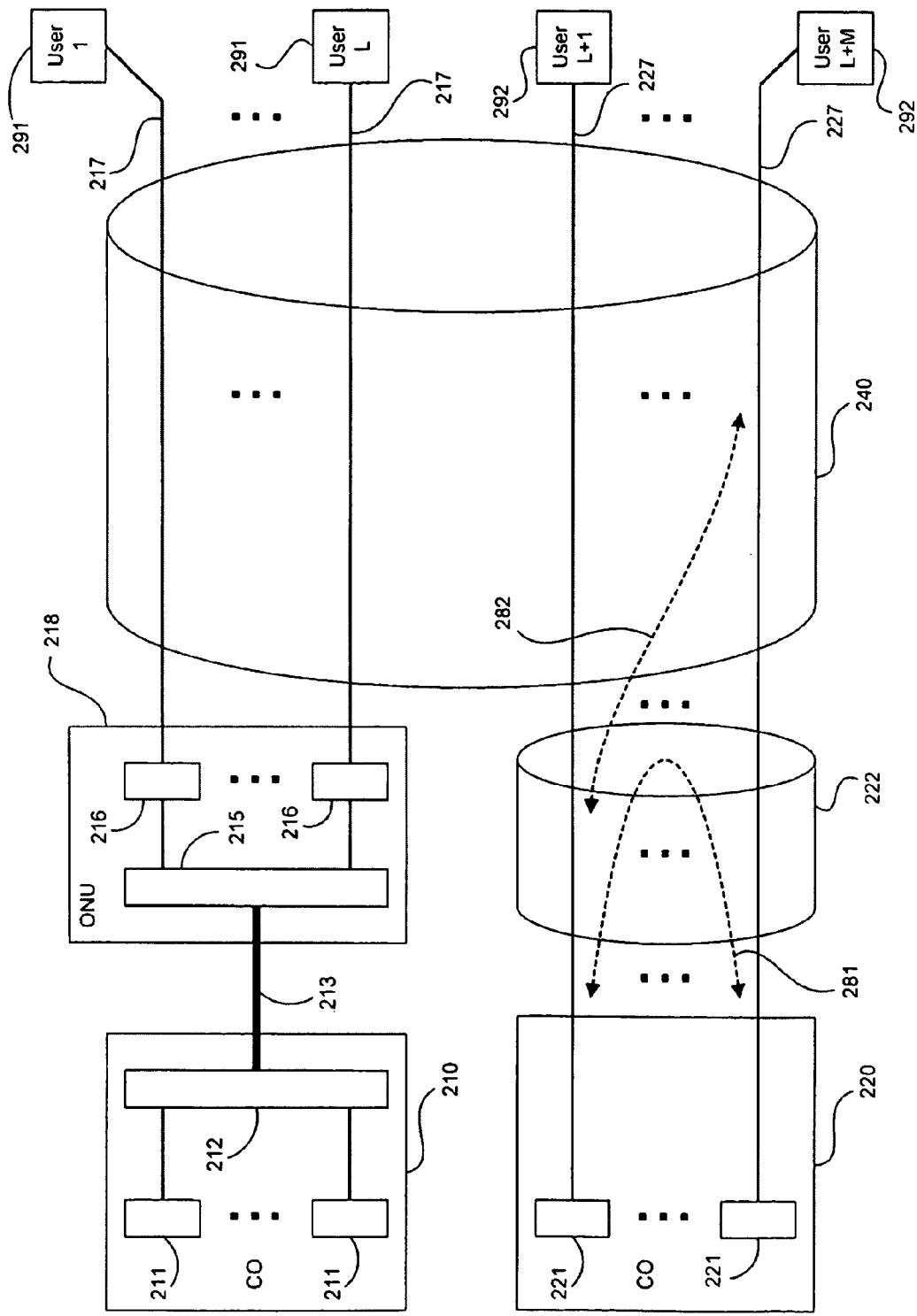
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

A vectored DMT channel (both upstream and downstream) is characterized in synchronized, digitally duplexed DSL systems by the simple matrix equation:

$$Y = HX + N \qquad \text{Equation (1)}$$

where H is a complex matrix that describes the insertion loss and crosstalk on a single tone and depends on the number of inputs and outputs used, including non-square versions of H when special channels such as phantom-mode signal channels are used. H is usually a square matrix that is size U×U for differential-only vectoring (and (2U−1)×(2U−1) in full two-sided vectoring with phantom-mode signals). H may be a different matrix for each tone and usually is not the same in upstream and downstream directions. H can be factored using QR factorization into H=QR or alternatively H=RQ, where R is a lower triangular matrix and Q is a unitary matrix so that QQ*=Q*Q=1. Those skilled in the art will appreciate that the matrix Q in the factorization may also be equivalently denoted by Q* as is sometimes done in the art and then throughout this document the invention can be equivalently described with Q* replacing Q; and then also Q similarly replacing Q*. For downstream reception, an equivalent theoretical $H_{eq}$ is computed by pre-multiplication of H by the inverse square-root of a noise spatial-correlation matrix designated $R_{nn}^{-1/2}$. When the noise spatial-correlation matrix $R_{nn}$ is chosen to represent the worst case noise for the channel, the equivalent theoretical $H_{eq}$ is often referred to as the worst-case-noise equivalent channel matrix. The worst-case-noise equivalent channel matrix can be factored using QR factorization to yield Q and R matrices for worst-case-noise.

Embodiments of the present invention involve the R matrix and the Q matrix in the RQ factorization that characterizes multi-user downstream vectored communications (such as DMT VDSL one-sided or two-sided transmissions). The G matrix in R=SG (where S is a diagonal scaling matrix that forces the diagonal elements of the triangular G to be all ones) is recognized as a set of precoder coefficients $(g_{i,j})$ in each of its rows. These precoder coefficients can vary with each tone used by each user and depend upon the order of users selected for each tone.

There have been two conventional approaches to precoders in transmission: the Tomlinson Harashima (TH) precoder and the flexible precoder. Both have found use in non-DSL applications, but should not be confused as being equivalent to embodiments of the present invention, which incorporate special characteristics that conform to the vectored DMT DSL system setting. The flexible precoder of V.34, V.90, and V.92 voiceband modem standards is a temporal precoder (that is, applied in time) and requires the use of adjacent time-decisions in both the transmitter and the receiver. Application to other "users" dimensions in downstream DSL receivers is not possible because the required "adjacent decisions" are in physically separated locations and not accessible in a single receiver. Thus, flexible preceding is not a viable option for one-sided vectored DMT in DSL.

A precoder is effective when the exact interference (for example, crosstalk in xDSL systems such as vectored DMT VDSL) that will be added by the channel is known in advance by the transmitter, but not by the receiver. For downstream transmissions of vectored DMT VDSL, the largest crosstalk typically comes from other users in the same binder. The downstream transmit signals in a common binder are known when all lines in the binder emanate from the same device (for example, a line-terminal (LT) or DSLAM). The TH precoder requires "adjacent" decisions only at the transmitter side, such as those available in a vectored DMT system at the transmit side. However, the TH precoder has a stationary presumption that leads to certain properties such as its output being uniformly distributed over a certain region and having independent values in time. These same properties are desirable in the "user dimension" also for vectored DMT, but are not necessarily assured with the spatially non-stationary user domain replacing the time domain presumed in the TH. Furthermore, the well-known conventional TH loses efficiency if constantly reset and started for each tone of each and every DMT symbol.

Multi-user precoders use the rows of the monic triangular G matrix as a set of coefficients for each user in terms of the previously encoded users' symbols. These rows vary with user. In DMT systems, there is a separate G for each tone. Furthermore, the constellation size on each user for any particular tone may differ. Thus, some embodiments of the present invention vary the modulo arithmetic (abbreviated as "mod") to conform to the constellation size that is precoded as processing occurs.

Communication systems such as DSL systems experience time-variation of the transmission environment. Such time-variation can include variation of the multi-line channel, for example due to temperature changes, component variations, mechanical stress, and other reasons. Time-variation also includes variation of the received noise, because of changes of the noise sources, such as crosstalk from other lines or interference from RF transmitters (for example AM transmitters, and HAM radio operators). Crosstalk noise may also change because of changes in the crosstalk coupling, or because of crosstalk sources turning on and off. Finally, time-variation includes users increasing their activity within a vectored DSL system, and users of a vectored DSL system that stop transmitting or otherwise reduce their activity.

Embodiments of the present invention use "adjustable" precoding in a vectored DSL system with DMT modulation. Embodiments of the present invention using adjustable preceding can include, but are not necessarily limited to, two features that provide improved DSL system operation. First, "adaptive" precoding permits adjustment of the precoding (for example, the R and/or Q matrices, precoding coefficients, etc.) in the sense of adapting to changing channel and/or noise conditions, etc. that affect performance due to time-variation. Moreover, embodiments of the present invention also provide "dynamic" preceding in the sense that subtraction, mod and dither (or subcombinations of these functions) are used/applied selectively and/or appropriately during precoding to accommodate power constraints and rules, etc.

In an adaptive system, either the matrix R or the matrix Q or both may be updated by a controller (such as a DSL optimizer) as frequently as needed to match the time-variations of the channel, as well as the noise. Such updating may be triggered directly (for example, by changes to the channel matrix H or to the noise spatial correlation $R_{nn}$), or indirectly (for example, by changes to the bit tables or to the gain tables of the users of the vectored DSL system, or by changes to the precoding order (within a tone) for the users of the vectored DSL system).

Because the precoder is re-initialized every DMT symbol, and the constellations vary as well as the modulo arithmetic, embodiments of the invention can add a dither signal that varies with user and constellation. This added dither is uniform over a transmission region for the current user transmission to ensure that precoder output user values are independent of one another and are uniform in distribution over an area of energy no smaller than the input energy (and usually only slightly higher). The dither has only been used as a theoretical abstraction to prove asymptotic theorems previously, but never suggested to resolve the non-uniformity that can accompany the vectored DMT DSL precoding situation. Embodiments of the invention also include square-to-checkerboard mappings for constellations having odd numbers of bits to improve the energy efficiency of preceding.

The dither and square mappings cause deviations from VDSL1 and VDSL2 standards that require the receiver to understand the higher-performance precoder. However, in other embodiments, both can be deleted at a slight energy loss for a receiver that is non-cooperative, but standard-compliant, as long as mod arithmetic is supported at the receiver. Finally, if the receiver does not support mod arithmetic either, then the transmitter can perform "subtraction" without use of mod. Such a simple subtractor can provide large gains in some cases, especially when crosstalk power at the receiver is significantly larger than background noise that cannot be cancelled, but is significantly smaller than the signal power at the receiver. To avoid unreasonable power penalties, the use of simple subtraction in a receiver that does not support mod arithmetic can be selective, turning off the subtraction function in cases where the power environment does not make its use desirable.

In this case, subtraction without use of mod will provide a large signal-to-noise ratio (SNR) gain at the receiver (because crosstalk is completely removed), while transmit energy is just slightly increased (because the magnitude of any subtracted signal is much smaller than the magnitude of the desired signal). When such a condition (that is, signal power>>crosstalk power>>background noise power) is not satisfied, the subtraction might result in a negative gain. Thus a dynamic use of subtraction depending on signal, crosstalk and noise power levels can be used. Earlier systems apparently avoided using subtraction, possibly because of the potentially large transmit power increase or a presumption that H was row-dominant so that no such subtraction was necessary. However, the condition of "signal power>>crosstalk power>>background noise power" occurs often in vectored DMT VDSL, and thus the subtraction can bring gains when used dynamically. This condition, when satisfied, allows pre-subtraction of non-negligible crosstalk interference. Stated another way, the condition of signal power>>crosstalk power>>background noise power can be characterized as the ratio of signal power to crosstalk power exceeding a power ratio threshold (for example, a signal power to crosstalk power ratio of 10:1 might be appropriate in some cases, though other ratios may be used depending on the conditions and situation, as will be appreciated by those skilled in the art).

Figure 3A:
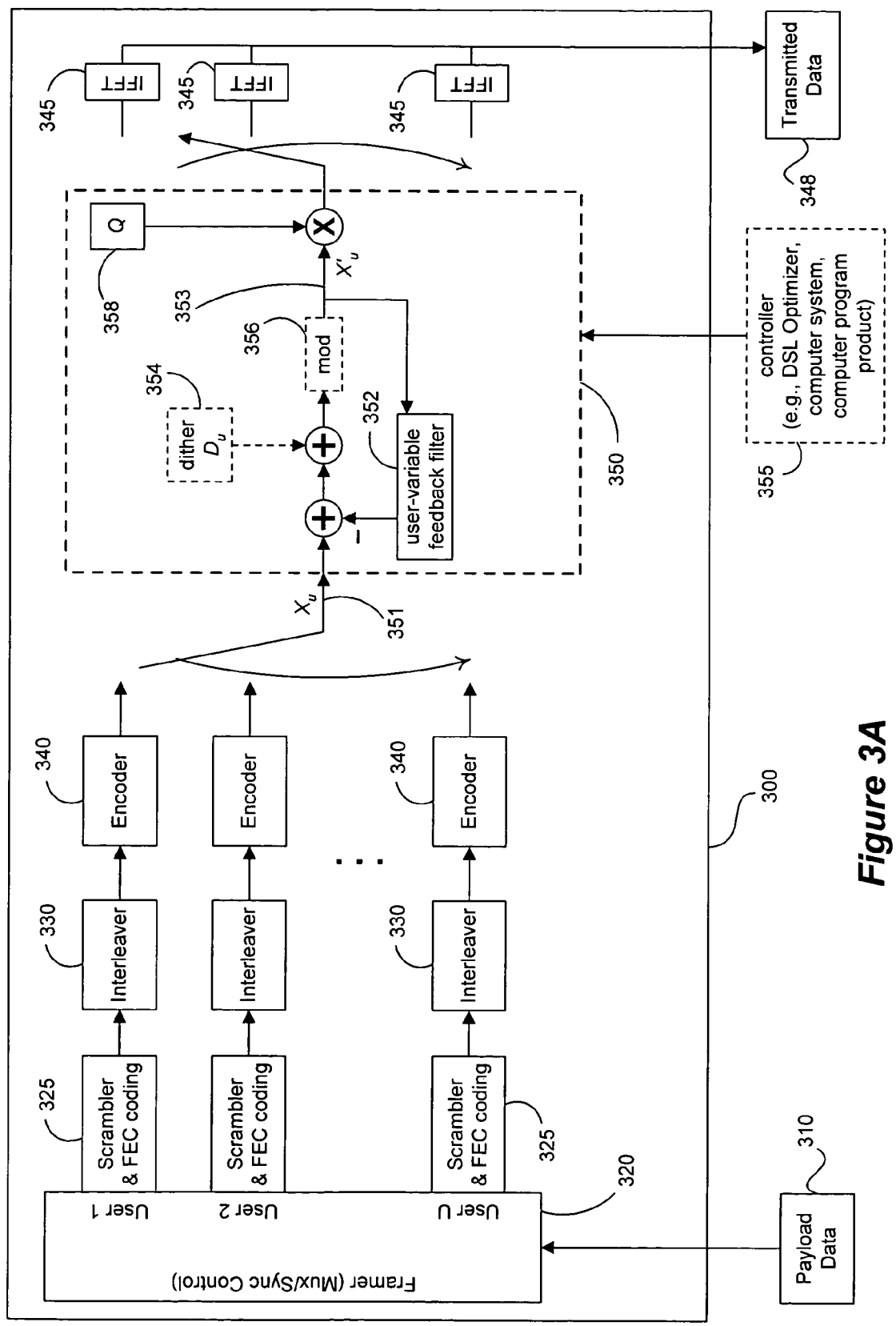
FIG. 3A is a transmitter usable with and/or implementing one or more embodiments of the present invention.

FIG. 3A illustrates one embodiment of the present invention in the context of a vectored DSL transmitter 300 (for example, the type found in a DSLAM or other upstream-end device). Payload data 310 of U lines is provided to a framer 320, which can include scrambling and FEC coding 325 for the U lines, as well as other processing, as will be appreciated by those skilled in the art. Data may be sent to an interleaver 330 in lines where impulse noise is an issue. The data for each user is encoded at an encoder 340, which outputs U data streams of complex numbers, where $X_u$ is from line u's encoder. The multi-user precoder 350, which is described in more detail below, sequentially addresses each $X_u$ delivered to the precoder's input 351, starting with the data from user 1. The data from precoder output 353 is multiplied by matrix Q 358, and consequently sent to an inverse fast Fourier transform (IFFT) unit 345 prior to transmission at 348. As will be appreciated by those skilled in the art, the IFFT units 345 accumulate each user's data so that an appropriate Fourier transform can be performed when sufficient data from a given user has been precoded and sent to unit 345.

The multi-user precoder 350 includes a user-variable feedback filter 352 that removes known downstream interference, for example by using the feedback subtraction term $g_{u,u-1} \cdot X'_{u-1} + g_{u,u-2} \cdot X'_{u-2} + \ldots + g_{u,1} \cdot X'_1$ for user u. The X' values are obtained from the precoder output 353 and the G matrix values are obtained from a controller, in the illustrative embodiment shown in FIG. 3A. Filter 352 may be controlled by controller 355 in some embodiments. For example, where a transmitter is using subtraction only (that is, where a receiver has neither dither nor mod functionality), the controller 355 can provide instructions to the filter 352 to turn off when power conditions are inappropriate for subtraction alone. The precoder 350 may also be programmed and/or equipped to adaptively change operation on its own, as well.

Controller 355 may update the precoder 350 (for example, G matrix in unit 352, Q matrix in unit 358, modulo operations in unit 356, and/or dither in unit 354) as necessary or appropriate, in some embodiments. Such updating may occur after the controller 355 obtains relevant information about the DSL system (for example, updated information about the channel H and/or the worst-case noise spatial-correlation matrix $R_{nn}$). Such updated information may trigger an update to the G matrix and/or the Q matrix to account for the new channel information and/or for the new worst-case noise. Alternatively, the controller may obtain directly from one or more receiver modules updated coefficient values for the G matrix and/or the Q matrix, new settings for the modulo operations, new settings for the dithering signal, etc. Also, the controller may update the precoder 350 after one or more of the receivers request new settings for the bit and gain tables of the vectored DSL transmitters. Finally, the controller may update the precoder 350 after one or more of the users of the vectored DSL system are turned off, or after one or more users are added to the vectored DSL system. The use of an adaptive multi-user precoder capable of performing one, some or all of these adaptive and/or dynamic functions has never been suggested previously.

An optional dither signal $D_u$ may be provided at 354 prior to the application of modulo arithmetic at 356 (using mod $\Delta_u$, which is explained in more detail below). When dither is not used, equivalently one skilled in the art will recognize that $D_u=0$ throughout this application.

Dither is optional, but receiver modulo arithmetic is mandatory with the use of a modulo-arithmetic precoder. Each receiver must support whatever special signal conditioning is used by the precoder 350 in transmitter 300. Per above, the precoder can be dynamically enabled or disabled by a controller such as a DSL optimizer (for example, a computer, computer system, processor, computer program product, IC, etc.) or the like. The precoder typically can operate independently on each (real or imaginary) dimension of the encoded signal $X_u$, one example of which is shown in FIG. 3C, between the IFFT and the normal DSL encoder in the transmitter, as shown in FIG. 3A. As explained in more detail below, embodiments of the present invention also include precoders that operate jointly on real and imaginary dimensions of $X_u$, one example of which is shown in FIG. 3D.

In FIG. 3C, the real component of signal $X_u$ is removed by filter 351-R, while the imaginary component of signal $X_u$ is removed by filter 351-I. The real component is supplied to a real component precoder 350C-R, where a user-variable feedback filter 352C-R applies the G matrix by using the feedback term $Re\{g_{u,u-1} \cdot X'_{u-1} + g_{u,u-2} \cdot X'_{u-2} + \ldots + g_{u,1} \cdot X'_1\}$ for user u, which is subtracted from the incoming data value for $X_u$. Dither 354C-R and mod arithmetic 356C-R may be applied, if in use. The value that exits precoder 350C-R is then the real component of $X'_u$, namely $Re\{X'_u\}$.

Similarly, the imaginary component of signal $X_u$ is supplied to an imaginary component precoder 350C-I, where a user-variable feedback filter 352C-I applies the G matrix by using a feedback term $Im\{g_{u,u-1} \cdot X'_{u-1} + g_{u,u-2} \cdot X'_{u-2} + \ldots + g_{u,1} \cdot X'_1\}$, which is subtracted from the incoming data value for $X_u$. Dither 354C-I and mod arithmetic 356C-I may be applied, if in use. The value that exits precoder 350C-I is then the imaginary component of $X'_u$, namely $Im\{X'_u\}$. The two terms at the outputs of precoders 350C-R, 350C-I are then combined using multiplication by j in complex arithmetic implementation at 359 to generate $X'_u$. As with the precoder 350 of FIG. 3A, the precoders 350C-R, 350C-I of FIG. 3C may optionally be controlled by a controller 355.

Figure 3B:
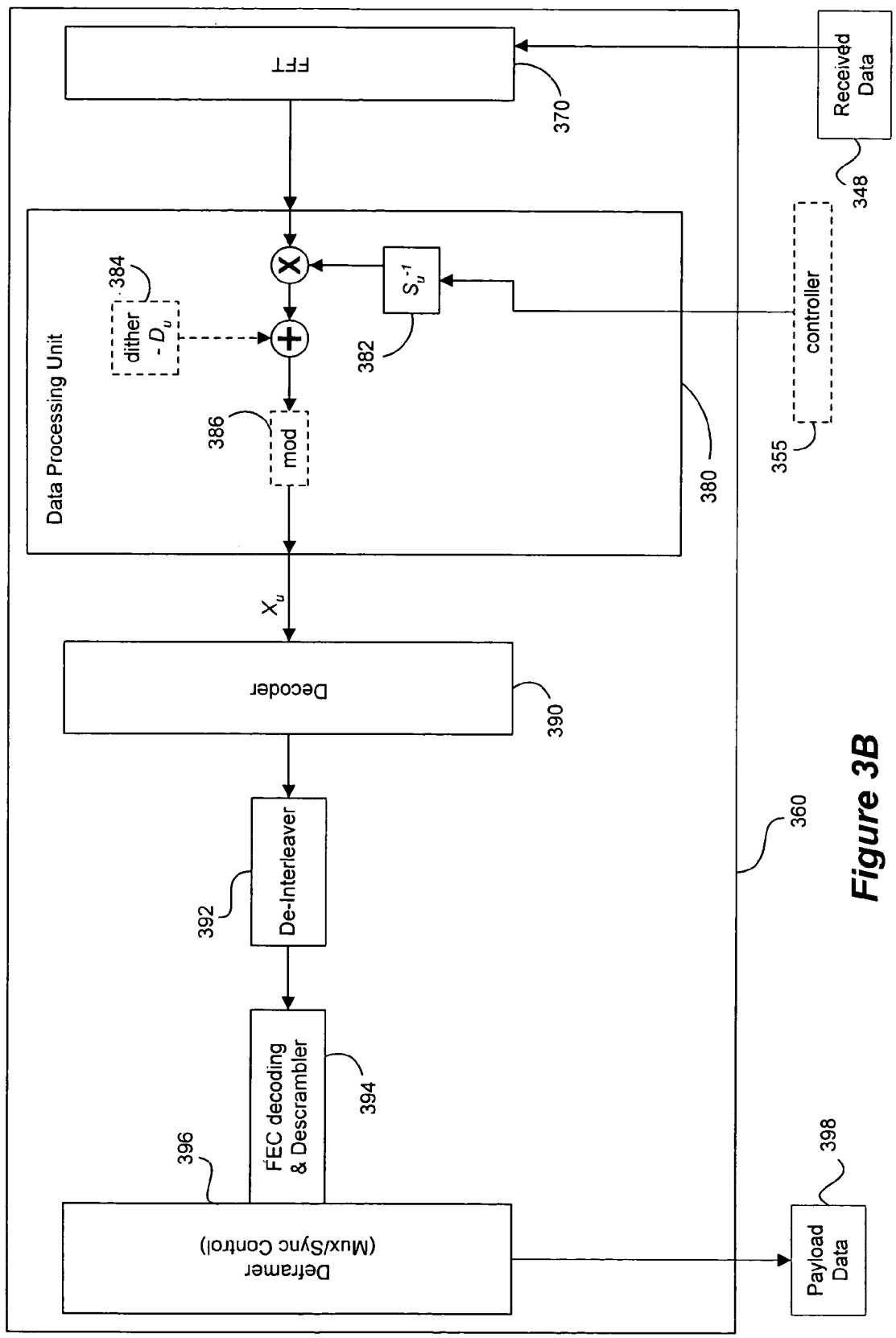
FIG. 3B is a receiver usable with and/or implementing one or more embodiments of the present invention.
Figure 3C:
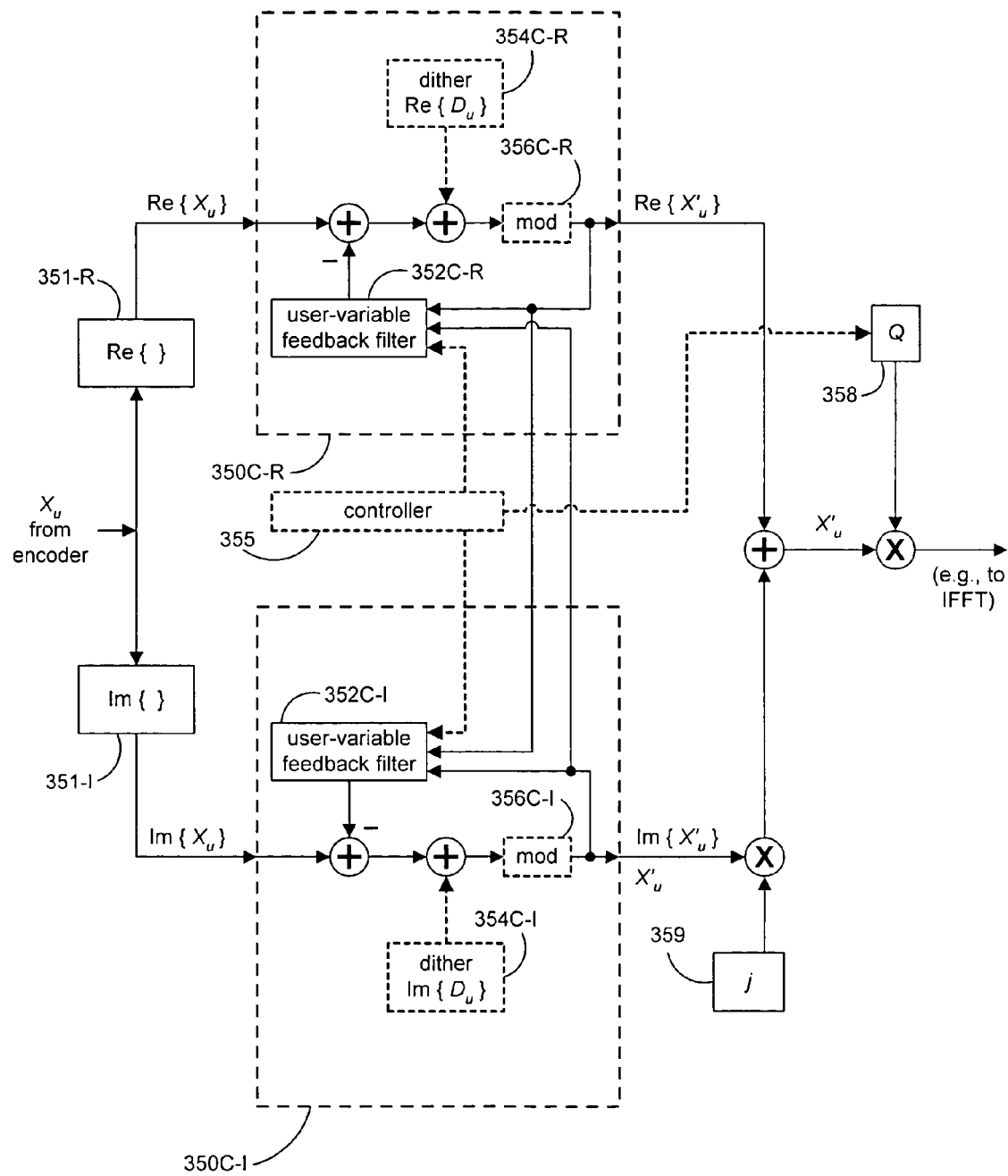
FIG. 3C is a transmitter implementing separate mod arithmetic functions in precoding for real and imaginary parts of an input data signal.
Figure 3D:
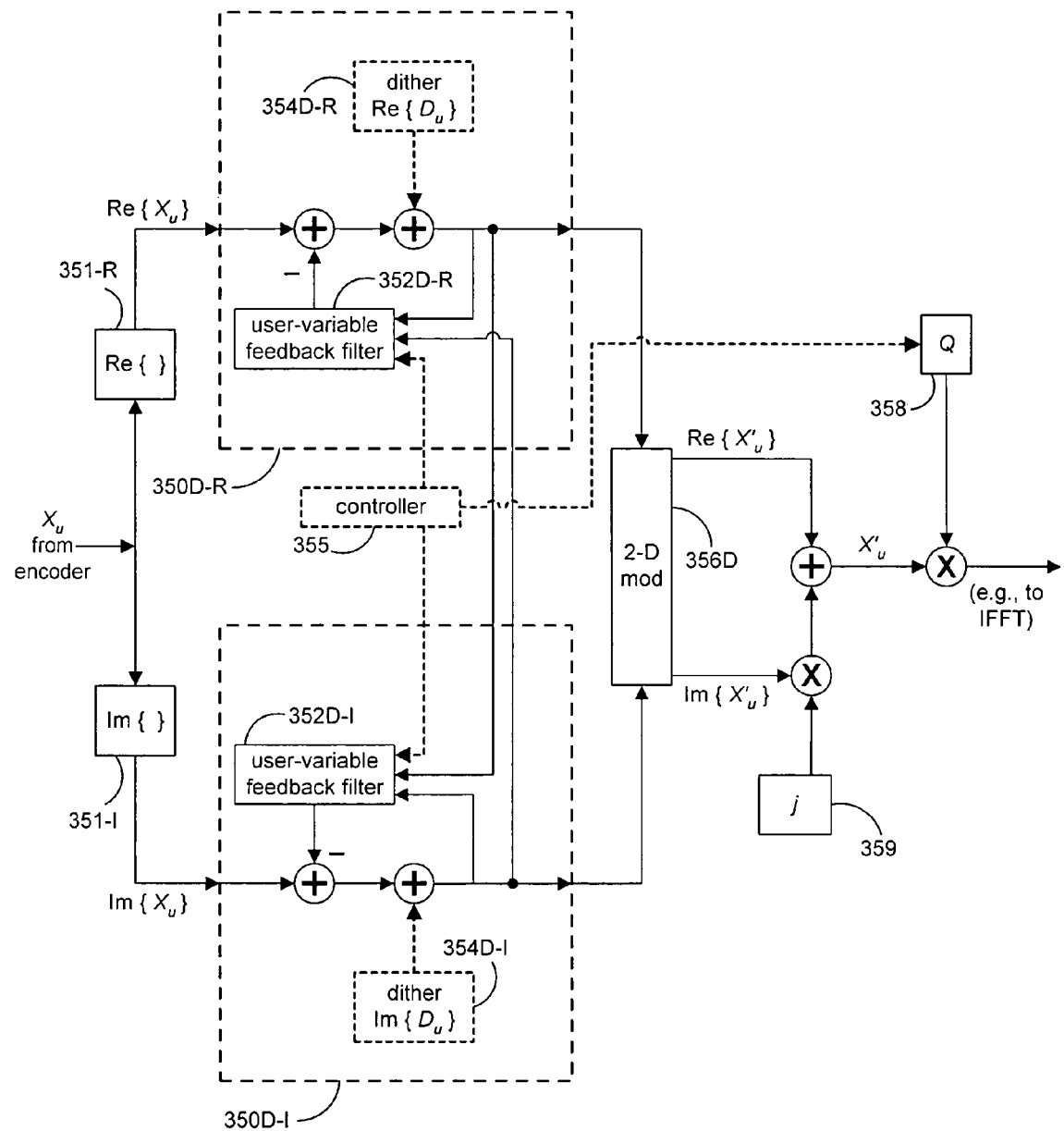
FIG. 3D is a transmitter implementing a joint mod arithmetic function in precoding for real and imaginary parts of an input data signal.

The precoding scheme of FIG. 3D is similar to that of FIG. 3C, except that, in FIG. 3D, the modulo arithmetic 356D receives both real and imaginary dimensions as inputs, and outputs real and imaginary dimensions of $X'_u$ jointly. Otherwise, the operation of the two precoders 350D-R, 350D-I of FIG. 3D is nearly identical to the operation of precoders 350C-R, 350C-I of FIG. 3C.

For each dimension, there is a slight energy expansion with the encoder in going from the signal with energy $E_x$ (before subtraction) to a signal with energy $E'_x$ (after subtraction). Such an energy increase is necessary to preserve the minimum distance between adjacent constellation points after precoding. If a system (for example, a DSL system) is operating using near maximum energy, the energy increase may not be acceptable, and the energy of an input signal to the precoder 350 needs to be scaled down properly. Such required energy reduction is commonly called energy loss. The precoding energy loss goes to zero with Gaussian codes that approach capacity, but such lossless precoding requires infinite delay and here, instead, the delay is finite and therefore some energy loss is unavoidable.

The quantity $\Delta_u$ is the base (circle size) of the modulo arithmetic used (basically 2's complement arithmetic with lowest negative element of $-\Delta_u/2$ and largest positive element $\Delta_u/2 - \Delta_{MIN}$, where $\Delta_{MIN}$ is the smallest step size used in representing signals). This modulus $\Delta_u$ of the arithmetic depends on the user and in particular on the energy of that user on a particular tone. Thus it is possible that the modulus may change on each cycle of the precoder.

The feedback section 352 is typically $g_{u,u-1} \cdot X'_{u-1} + g_{u,u-2} \cdot X'_{u-2} + \ldots + g_{u,1} \cdot X'_1$ for user u. On the first cycle (that is, for line/user 1), the feedback section 352 has zero (no) output. Gradually the number of terms increases with each cycle to U−1 terms for the last user for that tone, which encodes and then precodes the transmitted value. These terms have coefficients that also vary with user, which is indicated by the double subscript on the labels $g_{i,i-j}$. The first subscript i is the row number in G, while the second subscript i−j is the column number in G. The index j reflects how far away $g_{i,i-j}$ is from the diagonal element $g_{i,i}$, in the triangular matrix G. The modulus of the circular arithmetic varies in each cycle with the energy of the constellation and number of bits transmitted on that tone (which in turn may vary with time if bit-swapping causes changes in the bit distribution of any users). The ordering of users may change from DMT symbol to DMT symbol, and from tone to tone, so that the variation of modulus can be substantial. Observation of this is important to the proper implementation of embodiments of the present invention.

Additionally, the feedback section may employ techniques, which may exploit the properties of the triangular matrix G. When the G matrix is observed to have some its elements equal to 0 or sufficiently close to 0, then it may be represented as a "sparse" matrix. Computational savings may then be realized by employing sparse matrix-dense vector multiplication techniques, which are well known to those skilled in the art.

FIG. 3B illustrates a DSL receiver 360 that implements a single-user receiver (for example, at a CPE location) compatible with the tonal precoder 350 of FIG. 3A. Received data 348 is sent to a fast Fourier transform (FFT) unit 370 before the data is forwarded to a data processing unit 380. The data then is sent to a decoder 390 and thence to any required de-interleaver 392, FEC decoding and descrambling 394 and deframing 396 before being provided as payload data 398.

Initially, the scalar $S_u^{-1}$ is applied at 382. The content and application of the $S_u^{-1}$ matrix may be controlled by controller 355 in some embodiments. Any dither signal $D_u$ applied at the transmitter is removed at 384 and each data point is processed at 386 using any modulo arithmetic applied at 356 in the precoder.

When $b_u$, the number of bits carried on a given tone for user u, is even, then $$\Delta_u = 2\sqrt{3E_x'} = 2\sqrt{\frac{3 \cdot 2^{b_u} \cdot E_x}{2^{b_u} - 1}} \qquad \text{Eq. (2)}$$

For constellations having an even number of bits, the precoder can be applied to the real dimension and the imaginary dimension as shown in FIG. 3C with a slight energy loss of $2^{b_u}/2^{b_u}-1$, and the slight energy increase of $2^{b_u}/2^{b_u}-1$ should be reflected in any loading algorithm cost for transmitting a bit on that subchannel when precoding is used.

For constellations with an odd number of bits, the smallest square that contains all the constellation points can be used for the mod operation when modulo arithmetic operates on each dimension independently. For instance, square 420 shown in FIG. 4A can be used as the boundary of mod operation (sometimes called a "template") when the radial constellation 400 with data points 410 corresponding to b=3 in ADSL and VDSL is used. Assuming that the precoded signal is uniformly distributed inside of square 420, the new average transmit power ($E_x'$) per dimension can be calculated. This method can result in a large loss for small constellations, but works well for large constellations. The following Table 1 lists the resulting losses (caused by the increased transmit power) for the precoder of smallest size with respect to DSL's cross constellations (and radial and antipodal constellations for b=3 and b=1, respectively):

ing scheme of FIG. 3D (except for b=1 where the 1-D design is optimal). Prior constellation implementations include those disclosed in "Generalized Square and Hexagonal Constellations for Intersymbol-Interference Channels with Generalized Tomlinson-Harashima Precoders," Lee-Fang Wei, IEEE Transactions on Communications, Vol. 42, No. 9, September 1994, where "generalized square and hexagonal constellations" are considered for intersymbol-interference channels. These prior implementations, however, consider only single-user channels, and 2-D templates for the generalized square and hexagonal disclosed therein. The present invention expands the concept to multiple user-dimensions, and new templates according to the present invention are presented herein for different constellations.

Figure 4A:
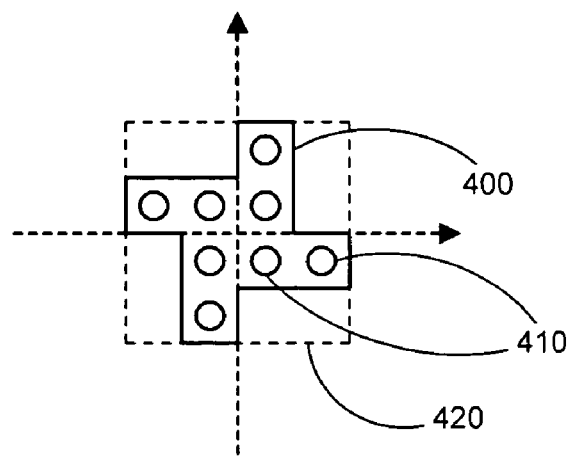
FIG. 4A is a radial constellation for b=3.
Figure 4B:
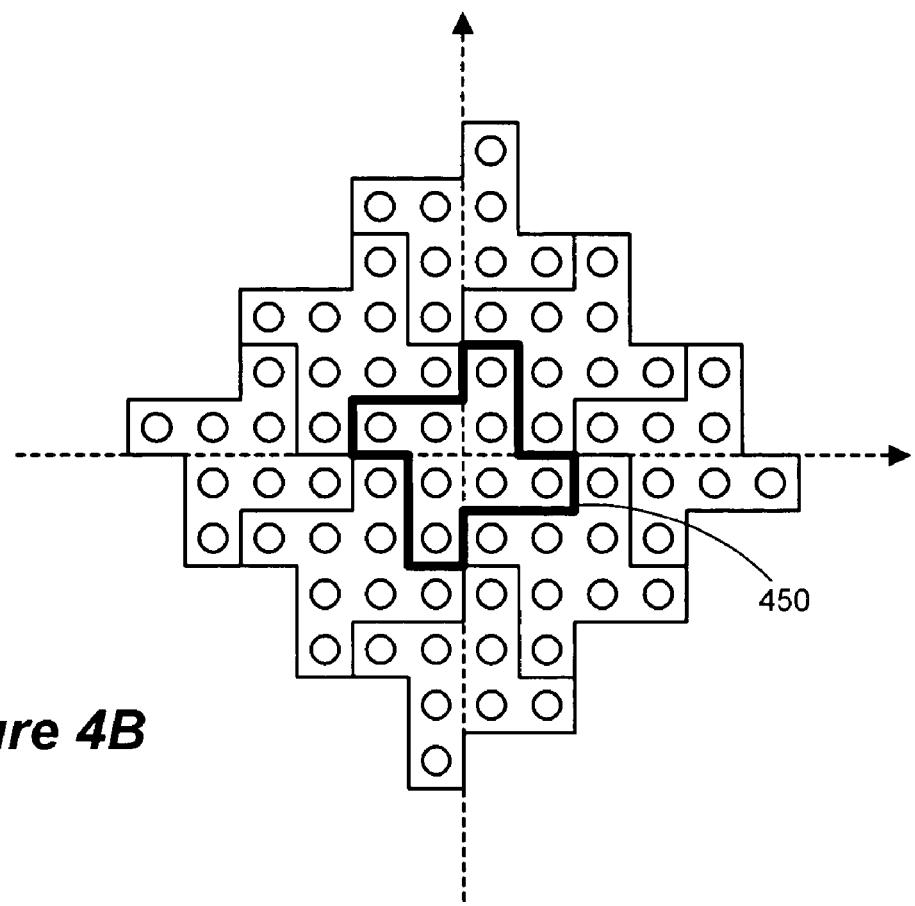
FIG. 4B is a template centered at the origin that shows the tessellation of the constellation by the shape of the type in FIG. 4A.

Consider the radial constellation used for b=3. FIG. 4A shows the radial constellation 400 of points 410 used in ADSL and VDSL standards for b=3, in which the x-axis represents the real part and y-axis represents the imaginary part of user signal $X_u$. Normal mod operations are independently defined for the x (real) and y (imaginary) components/dimensions, and thus the precoded constellation points can lie anywhere inside of the square 420 in FIG. 4A. Assuming that the precoded signals fall uniformly inside square 420, the average signal power per dimension is increased from 3 to 64/12, resulting in 2.5 dB of loss. At the receiver, only the 8 points 410 shown will be used for demodulation, and thus it can be seen that $d_{min}$ is still same after the precoding (precoding includes mod operation). Without reducing $d_{min}$, new boundaries can be defined for mod operation as shown in FIG. 4B (only first-tier neighbors are shown, but templates are repeated for $2^{nd}$, $3^{rd}$, $4^{th}$, etc. tiers). All the points are wrapped back to the region 450 outlined in bold in FIG. 4B, and the loss is only 0.46 dB with the 2-D template design.

As long as the receiver adopts the same region for mod operation, decoding performance is still determined by the same minimum distance $d_{min}$ that is directly connected to BER (bit error rate). In this case, the average transmit power per dimension reduces to 10/3, and thus the loss is reduced to

TABLE 1

Loss for odd bits when square boundaries are used (modulo arithmetic operates on each dimension independently)

| b | M | $E_x$ per dim ($d_{min}$ = 2) | $E_x$ per dim after precoding ($d_{min}$ = 2) | $\Delta_u$ | Largest pt in one dimension | Loss (dB) |
|---|---|---|---|---|---|---|
| 1 | 2 | 1 | 4/3 | 4 | 1 | 1.3 |
| 3 | 8 | 3 | 64/12 (10/3 with 2-D mod design; 8/3 with 2-D mod design plus transmit template optimization) | 8 | 3 | 2.5 (0.46 dB with 2-D mod design; −0.51 dB with 2-D mod design plus transmit template optimization) |
| 5 | 32 | 10 | 12 | 12 | 5 | 0.8 |
| 7 | 128 | 41 | 48 | 24 | 11 | 0.69 |
| 9 | 512 | 165 | 192 | 48 | 23 | 0.66 |
| 11 | 2,048 | 661 | 768 | 96 | 47 | 0.65 |
| 13 | 8,192 | 2,645 | 3,072 | 192 | 95 | 0.65 |
| 15 | 32,768 | 10,581 | 12,288 | 384 | 191 | 0.65 |

The large loss for b=3 reflects the poor choice of constellation notorious in DSL for b=3 in addition to the precoder loss. The dither sequence $D_u$ can be set to zero with possibly additional performance losses that depend on implementation specifics.

The loss can be reduced if the template (mod region) is designed with 2-D (2-dimensional) shapes, as in the precod- 0.46 dB. Compared to 2.5 dB loss using the square boundary, there is thus an improvement of 2.04 dB. The loss can be further reduced to −0.51 dB, or a gain of 0.51 dB, if a transmit template optimization, such as one discussed below, is used.

If the losses in Table 1 are acceptable (with the 2-D template design applied only to b=3), the precoder may be used with the value of $\Delta_u$ shown. The receiving modem can be standard-compliant and need not know a precoder is present except for performing the required mod operation. The optional dither sequence is a random sequence known to both transmitter and receiver and selected to be uniform in distribution over the interval from $-\Delta_u/2$ to $\Delta_u/2-\Delta_{MIN}$.

Figure 8:
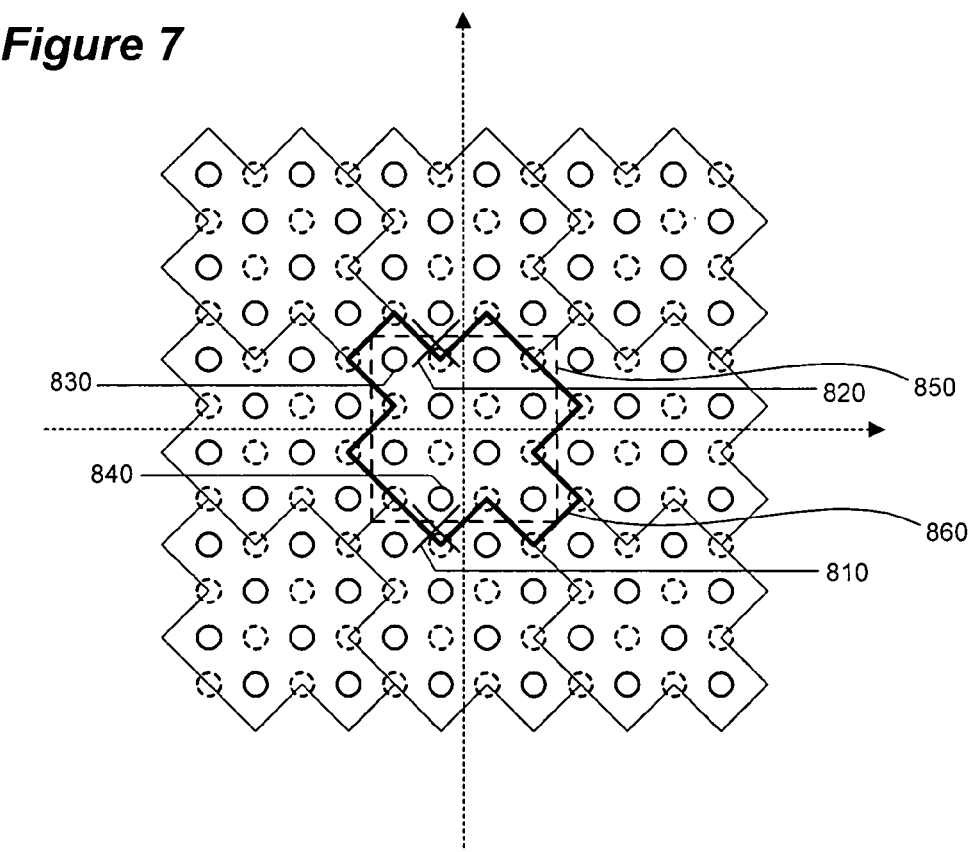
FIG. 8 is an improved template centered at the origin that shows the tessellation of the constellation by the shape of the type in FIG. 7.

If, however, a smaller loss than that listed in Table 1 is desired, then odd-square constellations according to embodiments of the present invention may instead be used for $b \geq 3$. An odd-square constellation is one in which every other point is selected/enabled from the even bit-numbered square having twice as many points (generating an arrangement resembling a checkerboard, and hence also called a checkerboard constellation). These constellations are not used in current standards nor are they in use generally otherwise, and thus appropriate modifications are necessary for transceivers in which such constellations might be used. An example is given below for $b=3$, but the same method can be applied to any odd $b \geq 3$.

constellations shown in FIG. 8. However, the transmitter may still use the square region 850 for mod (shown as a dotted square 850 in FIG. 8), without decreasing $d_{min}$ (note that the transmitter can choose any mod mapping region as long as each point in region 860 has one-to-one mapping to the new region). Because the average transmit power of the square region 850, assuming uniform distribution, is smaller than that of region 860, the optimal transmitter will choose the square region 850 for performing mod. However, the receiver can use region 860 to maintain the maximum $d_{min}$.

Figure 9:
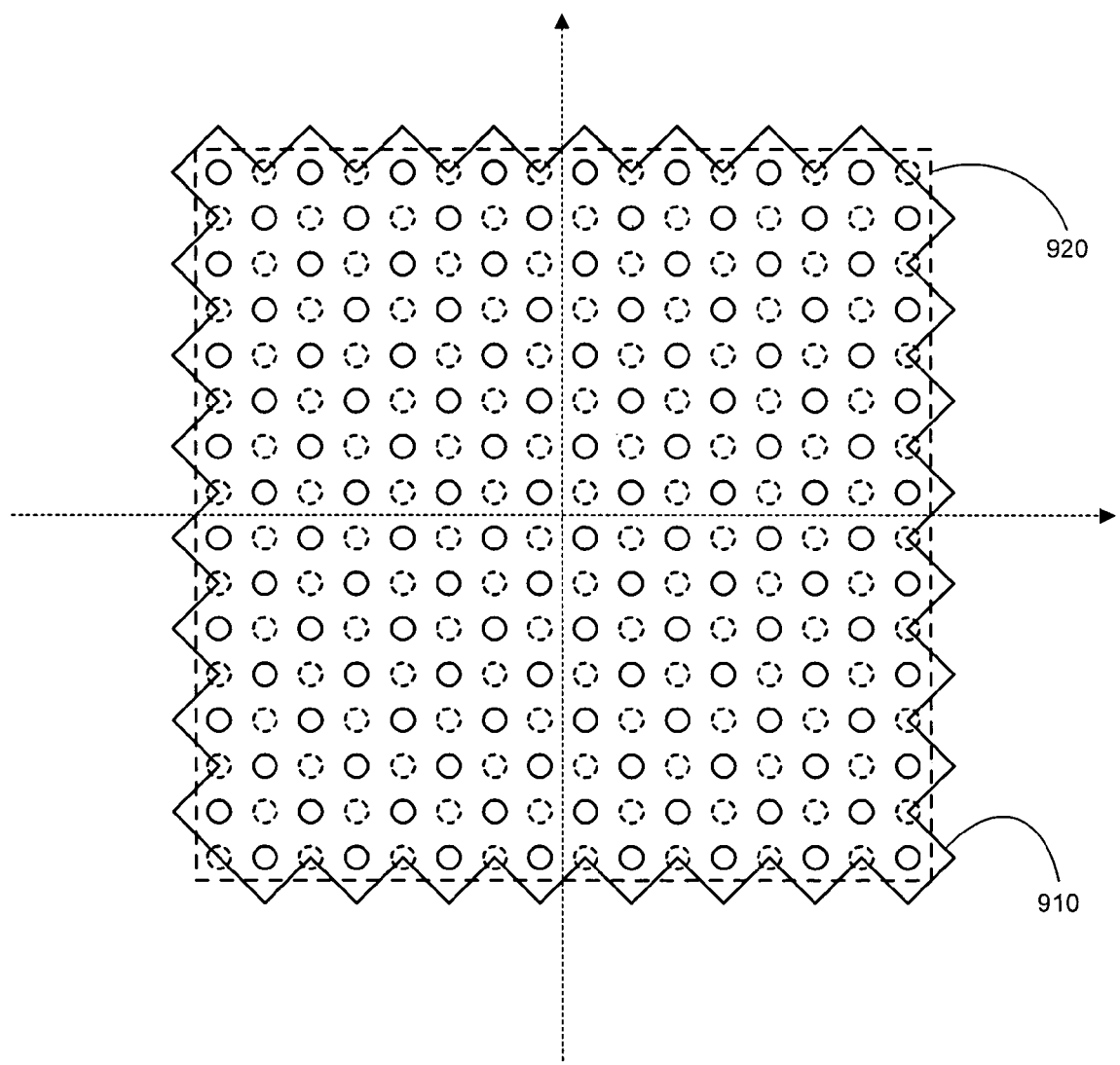
FIG. 9 is a b=7 checkerboard constellation, its template centered at the origin.

The example for $b=3$ can be generalized to any odd $b$, and $b=7$ is plotted in FIG. 9. Region 910 in bold lines represents the template to be used by the receiver's 2-D mod, while region 920 in dotted lines represents the template to be used by the transmitter's mod. Also, the loss of preceding for odd-square constellations, as well as the overall loss compared to cross constellations used in DSL standards, is shown in Table 2.

TABLE 2

Loss of odd-square constellations. 2-D mod is used.

| b | M | $E_x$/dim of cross constellations in standard (when $d_{min}=2$) | $E_x$/dim of odd-square (when $d_{min}=2$) | $E_x$/dim of odd-square after precoding (when $d_{min}=2$) | Loss of precoding (dB) | Overall loss (loss of odd-square + loss of precoding) compared to cross constellations in standard (dB) |
|---|---|---|---|---|---|---|
| 1 | 2 | 1 | 1.0 | 1.67 | 1.3 | 1.3 |
| 3 | 8 | 3 | 2.5 | 2.67 | 0.29 | −0.51 |
| 5 | 32 | 10 | 10.5 | 10.67 | 0.07 | 0.28 |
| 7 | 128 | 41 | 42.5 | 42.67 | 0.02 | 0.17 |
| 9 | 512 | 165 | 170.5 | 170.67 | 0.00 | 0.15 |
| 11 | 2,048 | 661 | 682.5 | 682.67 | 0.00 | 0.14 |
| 13 | 8,192 | 2,645 | 2,730.5 | 2,730.67 | 0.00 | 0.14 |
| 15 | 32,768 | 10,581 | 10,922.5 | 10,922.67 | 0.00 | 0.14 |

In FIG. 5A, the diagram is a 16-square constellation with active constellation points 530 for $b=4$ where $d_{min}=1$. FIG. 5B is the checkerboard constellation derived from FIG. 5A with active constellation points 530 and removed (de-activated) constellation points 535 for $b=3$, where the points 535 in dashed lines have been removed from consideration. The decision regions of the receivers for the original 16-square are defined by straight, dotted lines 520. If the mod for the derived checkerboard constellation is defined as the same as in the 16-square, then all the signal points will be wrapped inside of the square region 600 set off in bold lines in FIG. 6, which shows one mod operation for checkerboard constellations. If the received signal point is the X 610 shown in FIG. 6, the closest constellation point among the 8 candidate points in square 600 is 640. Received signal 610, however, is then wrapped to the X 620 because of the design of the template region of the mod and finally decoded as point 630 because 630 is the closest constellation point to wrapped point 620. Therefore, $d_{min}=2$ (the size of square 600 is assumed to be 8×8) using the square mod region.

Figure 7:
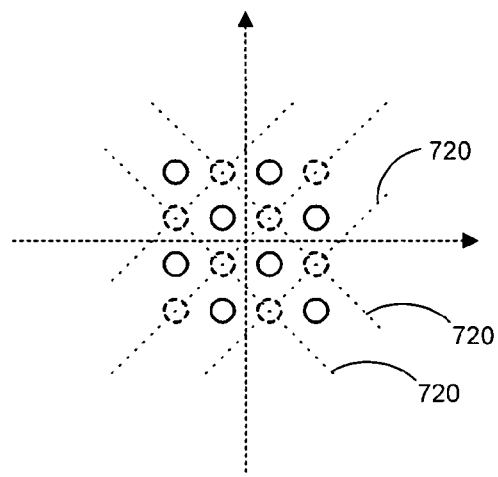
FIG. 7 is a checkerboard constellation for b=3 and its ideal decision regions.

In fact, $d_{min}$ can be increased. As indicated by dashed lines 720, FIG. 7 shows the ideal decision region for the checkerboard constellation of FIG. 5B where $d_{min}$ is $2\sqrt{2}$. To keep the same optimal $d_{min}$, a 2-D mod template can be designed as shown in FIG. 8. Note that X 810 (whose location is slightly farther than 1 from data point 840) is now decoded as point 840.

To achieve the maximum $d_{min}$, the receiver can adopt the new 2-D mod region 860 shown in bold lines for odd-square Odd-square constellations generally lose approximately 0.14 dB compared to the cross constellations (except for $b=3$, where the odd-square is better than the radial constellation of DSL), and only suffer a small additional loss from preceding. The use of checkerboard constellations generally causes at least a 0.51 dB gain compared to Table 1 for all constellations except for $b=1$. The one-bit constellation loses 1.3 dB with precoding, regardless of the situation. For the simplest adjustment to existing standard-compliant encoders, the following rule allows their use in the proprietary mode:

If the number of bits b is odd, the encoder for the next largest even integer b+1 is used. The b upper-most significant bits are used and the least-significant bit is set as the complement of the next-to-least significant bit.

Similarly a proper decoder would only consider points with the two lsb's complementary in applying decoding rules for the closest point in each coset in trellis coded situations and straightforward decoding in observance of the rule without the trellis coding. The mode of operation described above typically saves approximately ½ dB (in addition to the substantial gains usually associated with vectoring).

Figure 10A:
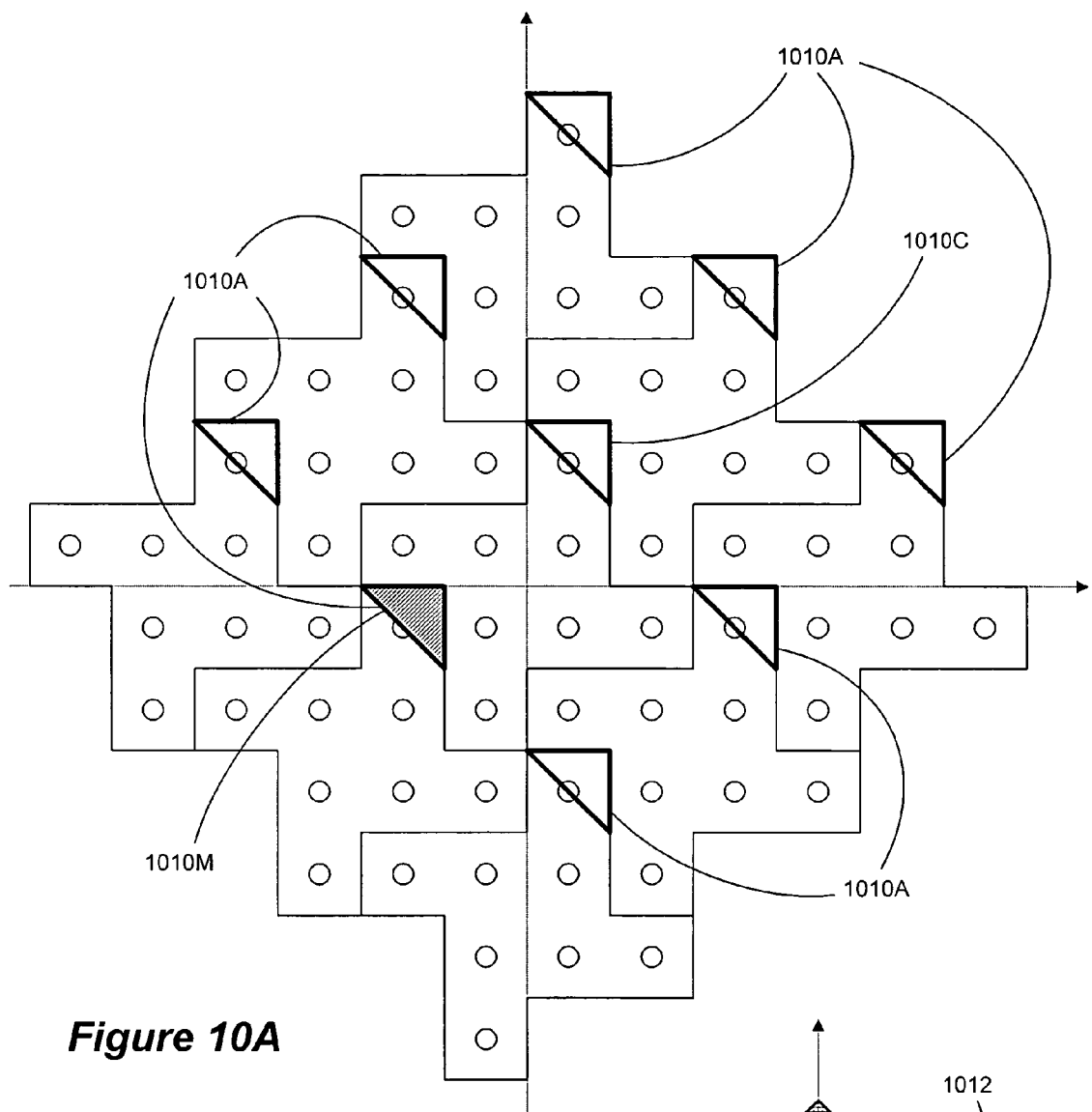
FIG. 10A is a template centered at the origin that shows the tessellation of the constellation by the shape of the type in FIG. 4A.
Figure 10B:
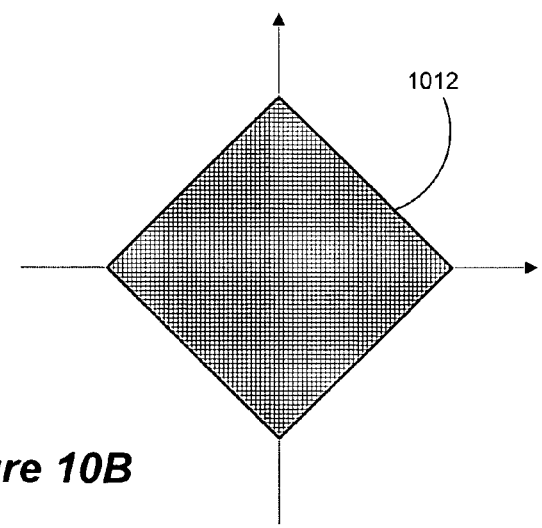
FIG. 10B is a transmit template centered at the origin that also can be used to tessellate the full constellation by the radial constellation of FIG. 4A. The template minimizes transmit power.

As mentioned above, the transmitter templates can always be optimized (or at least improved) to transmit minimum energy without reducing $d_{min}$ as long as each point in the original transmit template region generally has one-to-one mapping to the new template region. As an example, the template used in FIG. 4B is re-visited in FIG. 10A. In FIG. 10A, the transmitter may transmit any of the "alternate" regions 1010A, rather than the "center" region 1010C, without making any difference at the receiver side, as long as the original template is used for mod at the receiver. However, the transmit power is reduced (and, in fact minimized) by transmitting region 1010M, instead of 1010C (or any other region 1010A). The same can be done for 3 other similar corner regions, and the resulting transmit region becomes a diamond shape 1012 as shown in FIG. 10B. Using the transmit region in FIG. 10B, the transmit power is further reduced, and in fact falls below the original energy before the precoding. Overall, the energy penalty is −0.51 dB (or a gain of 0.51 db) using the new transmit region.

Mathematically, the above result can be explained by designating the center template that is used for transmission as 0, and the other templates as 1, 2, 3, etc. The origin of template n is $(x_n, y_n)$. All the points that can be expressed as $(x_n, y_n)+(a, b)$ for a fixed (a, b), where a and b are small enough to keep $(x_n, y_n)+(a, b)$ in template n, will map to the same point in template 0 after mod and the point is $(x_0, y_0)+(a, b)$. Then, instead of transmitting $(x_0, y_0)+(a, b)$, transmit $(x_m, y_m)+(a, b)$, where the energy of $(x_m, y_m)+(a, b)$ is smaller than the energy of $(x_0, y_0)+(a, b)$. In general, the best template index m can be found for any (a, b), and the transmit region can be chosen to be the set of such minimal energy points. For b=3 in FIG. 10A, the resulting transmit region 1012 is shown in FIG. 10B. For b=7 in FIG. 9, the square region 920 outlined in dashed lines can be used as the transmit region to minimize the transmit power while the region 910 can be used as the receiver mod region to maximize $d_{min}$.

The following template optimization rule summarizes the method for minimizing transmit power when the template does not have optimal shape:

Transmit Template Optimization Rule: The transmit region can be optimized to have minimum transmit power by choosing the proper m for each point (a, b) in an original transmit region such that $|(x_m, y_m)+(a, b)| \leq |(x_n, y_n)+(a, b)|$ for any n.

This transmit template optimization rule can be applied to any 2-D design of mod, and can even be used to reduce transmit power of earlier generalized square constellations.

When customer modems cannot support the mod operation at a receiver, then precoding with subtraction alone (that is, no mod at the transmitter) may be used. In such cases, the ordering of precoding needs to load modems in the following order:

1—The set of modems that use neither subtraction-only preceding nor mod-enabled precoding; then
2—The set of modems that use subtraction-only preceding; then
3—The set of modems that use mod-enabled preceding.

The ordering of users in set 1 and 2 maybe mixed, depending on the gain of subtractions.

In summary, embodiments of the present invention can implement one or more tonal subtraction-only precoders that pre-subtract known interference signals, typically from crosstalk. Each such subtraction-only precoder can be dynamically turned on or off, depending on the power effects (for example, gain or loss) of the subtraction-only precoder.

The tonal mod-enabled precoder can use modulo arithmetic that operates on each dimension independently (1-D), on 2-D jointly, or on n-D (n>2) jointly with user-variable coefficients using the user-variable modulo arithmetic, and again the precoder can be dynamically turned on or off depending on power characteristics (for example, the gain or loss of the precoder). In some cases, each subtraction-only precoder and/or mod-enabled precoder also terminates and restarts each symbol period.

An adaptive precoder according to some of the embodiments of the present invention can be updated by a controller to compensate and/or account for time-varying effects, as noted above. Such updating may be required as the multi-line channel changes, or as the worst-case-noise assumptions vary. Also, it may be needed as users enter or exit the vectored DSL system.

A precoder according to some of the embodiments of the present invention may not be diagonal in the sense that the G matrix of a vector channel may have non-negligible, off-diagonal elements. This is in contrast to what has been accepted by many in the field. When desirable, these systems can use two modulo operators with different template shapes at transmitter and receiver, where reshaping of the transmit template can be done to minimize transmit power at the transmitter, such as in the examples presented above. Likewise, receiver templates can be reshaped to maximize $d_{min}$, regardless of what template shape was used for transmission. Various new templates have been disclosed herein for use with odd-square constellations. Where such odd-square (checkerboard) constellations are used, it is possible to save an additional 0.5 dB.

Changes can be made to accommodate bit swapping; that is, modulo arithmetic can be updated in accordance to changes in the number of bits and the resulting constellation, which change with bit-swapping. Finally, the present invention includes techniques for ordering of mixed receivers where some receivers are modulo-enabled and the others are not.

Various apparatus according to the present invention can implement one or more of the methods and/or techniques discussed above. According to one embodiment of the present invention shown in FIG. 11A, a preceding control unit 1100 may be part of an independent entity coupled to a DSL system, such as a controller 1110 (for example, a device functioning as or with a DSL optimizer, DSM server, DSM Center or a dynamic spectrum manager) assisting users and/or one or more system operators or providers in operating and, perhaps, optimizing use of the system, including implementation of precoding at one or more transceivers. (A DSL optimizer may also be referred to as a dynamic spectrum manager, Dynamic Spectrum Management Center, DSM Center, System Maintenance Center or SMC.) In some embodiments, the controller 1110 may reside inside a transceiver (such as an ATU-C or VTU-O), may be an ILEC or CLEC operating a number of DSL lines from a CO or other location, or may be a completely independent entity operating within a given system. As seen from the dashed line 1146 in FIG. 11A, the controller 1110 may be in the CO 146 or may be external and independent of CO 146 and any company operating within the system. Moreover, controller 1110 may be coupled to, communicating with and/or controlling DSL and/or other communication lines in multiple COs. In some embodiments of the present invention, the controller 1110 controls and/or communicates with a vectored DSL system in a specific binder. The DSL lines in the binder may be ADSL, VDSL and/or other communication lines in various combinations. The preceding control unit 1100 has access (directly or indirectly) to information and/or data regarding the various lines in the subject binder and may be able to control certain aspects of those lines' operation.

Figure 11A:
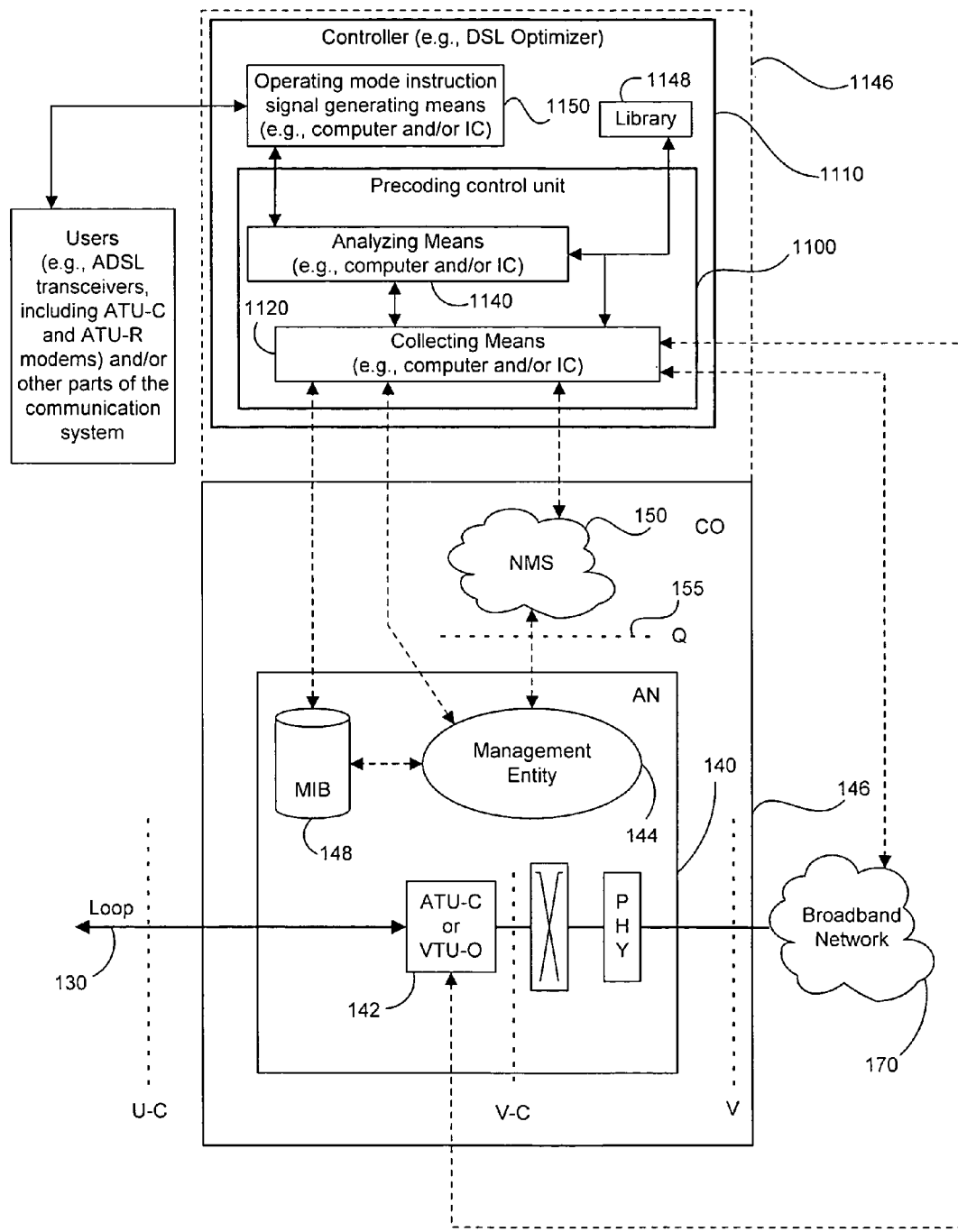
FIG. 11A is a controller including a compliance control unit according to one embodiment of the present invention.

The preceding control unit 1100 includes a data collection unit 1120 identified as a collecting means and an analysis unit 1140 identified as analyzing means. As seen in FIG. 11A, the collecting means 1120 may be coupled to NMS 150, ME 144 at AN 140 and/or the MIB 148 maintained by ME 144, any or all of which may be part of an ADSL and/or VDSL system for example. The collecting means 1120 may also be directly coupled to one or more ATU-C/VTU-O units 142. Data also may be collected through the broadband network 170 (for example, via the TCP/IP protocol or other protocol or means outside the normal internal data communication within a given DSL system). One or more of these connections allows the preceding control unit to collect operational data from the system, including operational data from modems and other components operating within the system. Data may be collected once or over time. In some cases, the collecting means 1120 will collect on a periodic basis, though it also can collect data on-demand or any other non-periodic basis (for example, when a DSLAM or other component sends data to the precoding control unit), thus allowing the precoding control unit 1100 to update its information, operation, etc., if desired. Data collection by collecting means 1120 may depend on the frequency of channel and/or noise variation, on the frequency with which users turn on and off within the vectored DSL system, etc. Therefore, data collection can be "tuned" to one or more of these factors to provide timely information without generating too much data and/or information.

In the exemplary system of FIG. 11A, the analyzing means 1140 is coupled to a DSLAM, modem and/or system operating signal generating means 1150 inside or outside the controller 1110. This signal generator 1150 is configured to generate and send instruction signals to modems and/or other components of the communication system (for example, ADSL and/or VDSL transceivers and/or other equipment, components, etc. in the system). These instructions may include commands dynamically turning on and off precoding and/or subtraction in transmitters, providing channel crosstalk and insertion loss information and matrices, controlling modulo functioning, altering and/or adjusting various power and mod templates, adjusting operation to accommodate changes in bit distributions and bit swapping, instructions regarding ordering and/or any other operational characteristics of the relevant communication lines.

Embodiments of the present invention can utilize a database, library or other collection of data pertaining to the data collected, past operation of the vectored DSL system and any other relevant lines and equipment. This collection of reference data may be stored, for example, as a library 1148 in the controller 1110 of FIG. 11A and used by the analyzing means 1140 and/or collecting means 1120.

In various embodiments of the invention, the precoding control unit 1100 may be implemented in one or more computers such as PCs, workstations or the like. The collecting means 1120 and analyzing means 1140 may be software modules, hardware modules or a combination of both, as will be appreciated by those skilled in the art. When working with a large numbers of modems, databases may be introduced and used to manage the volume of data collected.

Figure 11B:
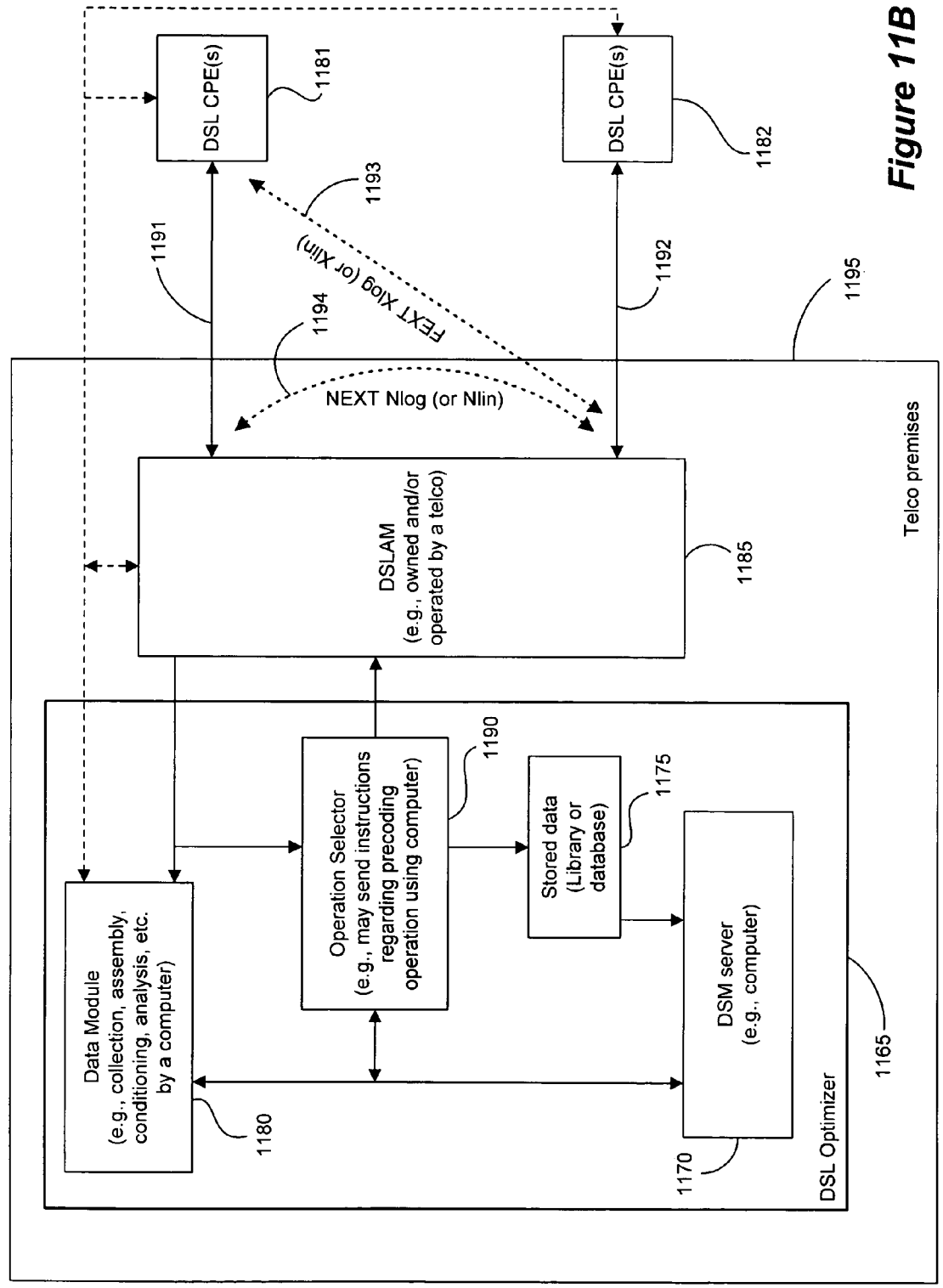
FIG. 11B is a DSL optimizer of one embodiment of the present invention.

Another embodiment of the present invention is shown in FIG. 11B. A DSL optimizer 1165 operates on and/or in connection with a DSLAM 1185 or other DSL system component, either or both of which may be on the premises 1195 of a telecommunication company (a "telco"). The DSL optimizer 1165 includes a data module 1180, which can collect, assemble, condition, manipulate and supply operational data for and to the DSL optimizer 1165. Module 1180 can be implemented in one or more computers such as PCs or the like. Data from module 1180 is supplied to a DSM server module 1170 for analysis (for example, evaluating precoding operational issues, deciding on adaptive changes to systems, etc.). Information also may be available from a library or database 1175 that may be related or unrelated to the telco.

An operation selector 1190 may be used to implement, modify and/or cease DSL and/or other communication operations, including implementation of various operational parameters involving transmit power, carrier masks, etc. Moreover, implementing embodiments of the present invention, selector 1190 can send instructions regarding precoding operation and data and/or information to support such operation. Decisions may be made by the DSM server 1170 or in any other suitable manner, as will be appreciated by those skilled in the art. Operational modes and/or parameters selected by selector 1190 are implemented in the DSLAM 1185 and/or any other appropriate DSL system component equipment. Such equipment may be coupled to DSL equipment such as customer premises equipment 1181 and 1182. The system of FIG. 11B can operate in ways analogous to the system of FIG. 11A, as will be appreciated by those skilled in the art, though differences are achievable while still implementing embodiments of the present invention.

Figure 12:
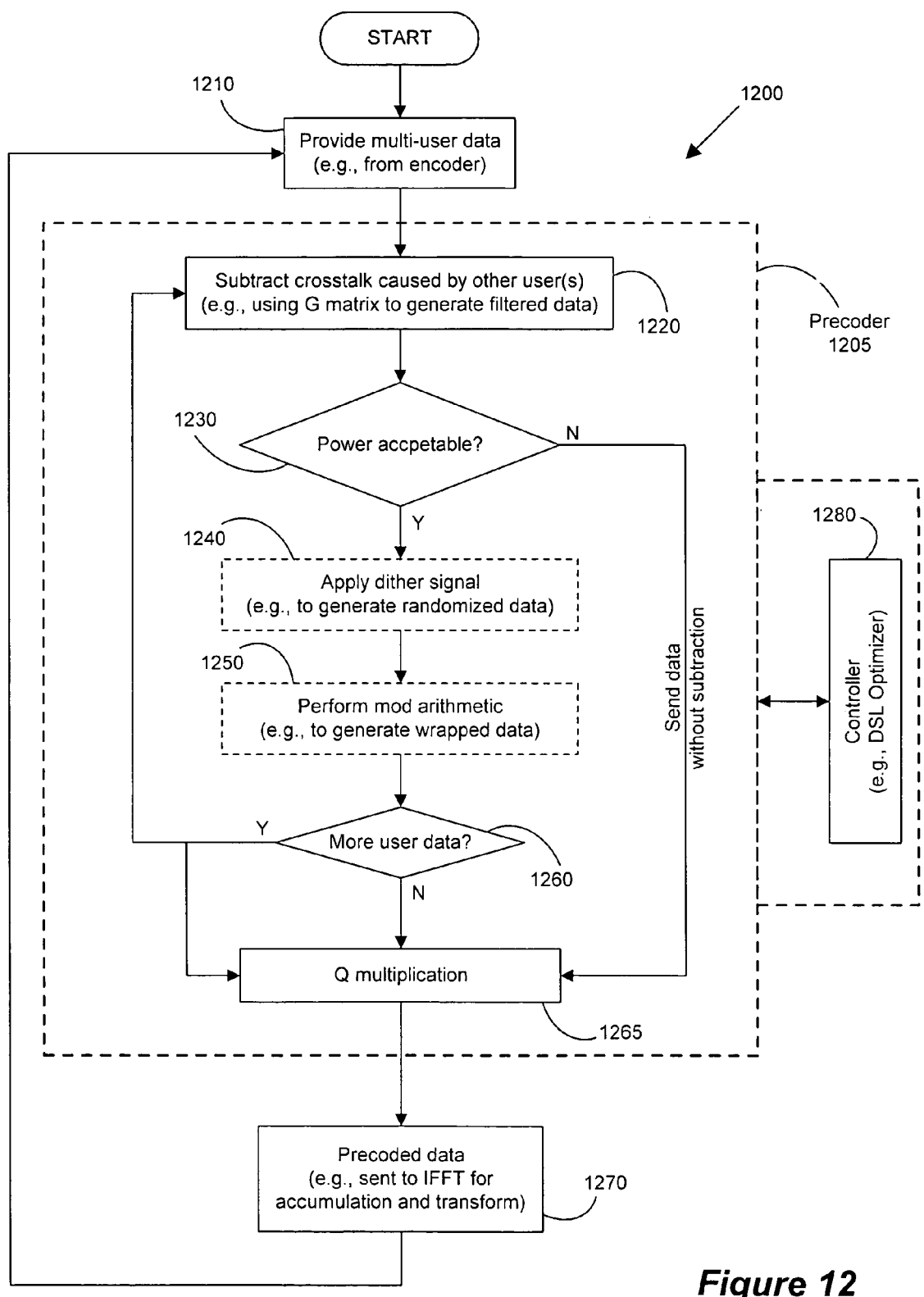
FIG. 12 is a flow diagram implementable as a method or software implementation of the precoder of the present invention.

Methods 1200 according to some embodiments of the present invention are shown in FIG. 12. As can be seen in FIG. 12, multi-user data can be provided at 1210 to a precoder 1205. The precoder may include a controller 1280 or may be coupled to a controller 1280 that is in a remote location, as indicated by the dashed lines in FIG. 12. The multi-user data is supplied to a user-variable feedback filter where crosstalk from one or more other users is subtracted at 1220, for example using a G matrix to generate filtered data. At 1230 a decision is made as to whether or not the filtered data complies with any power penalty rules or the like. If the filtered data is acceptable, it may be passed for further processing. If the filtered data is not acceptable, and the precoder 1205 uses subtraction-only precoding, then method 1200 dynamically sends unfiltered data as the precoded data to the next point in the transmitter, for example multiplication with a Q matrix.

When implemented, filtered data may have a dither signal applied at 1240 to generate randomized data and may also have mod arithmetic performed at 1250 to generate wrapped data. Even when the dither signal is not available or effectively set to zero at 1240 so that the output of 1240 is equal to the input, the mod arithmetic may still be applied to the filtered data. At 1260 the method 1200 can decide whether there is additional user data to be precoded. If so, method 1200 can return to 1220 for subtraction involving the next user's data for a given tone. The data that has just been processed is sent to matrix Q multiplication at 1265, which yields the precoded data at 1270, perhaps for accumulation and transformation by an IFFT. If there is no more user data for the tone being processed by precoder 1205, then the next multi-user data is provided at 1210 (for example, the next tone). As will be appreciated by those skilled in the art, the "precoded data" generated by precoder 1205 may be the filtered data or the wrapped data (with or without randomization from a dither signal) or the unfiltered data (where subtraction-only precoding is used and the filtered data would violate a power penalty rule, for example). Controller 1280 can provide instructions on whether dither should be applied or not (or equivalently set to zero), whether mod arithmetic should be applied or not (or equivalently set to zero), whether the power level should be checked in 1230 or not, etc. in method 1200 and/or supply the threshold for the acceptable power level, information needed to generate dither signal or the dither signal itself, etc.

Figure 13:
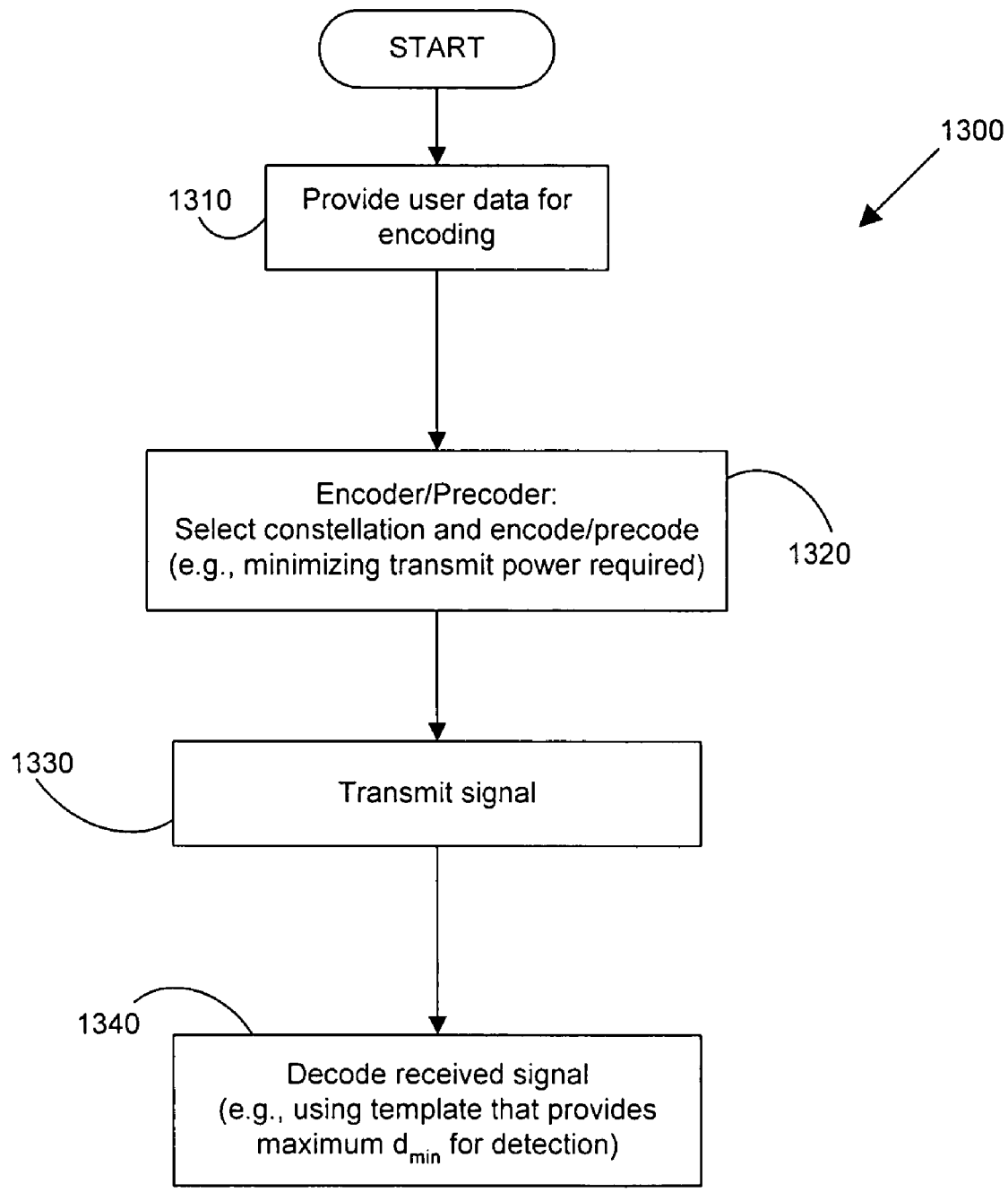
FIG. 13 is a flow diagram implementable as a method or software implementation of variable-size constellations and templates used by the present invention.

Method 1300 shown in FIG. 13 also implements one or more methods of the present invention. At 1310 the user data is provided for encoding. A constellation is chosen at 1320 according to the SNR of the channel and the calculated or informed (for example, from a controller such as a DSL optimizer) preceding power loss, and the user data is encoded/precoded properly. For odd-numbered bits, the checkerboard-shaped constellations described and illustrated herein and the transmit template optimized according to a transmit template optimization rule can be used. The encoded/precoded signal is then transmitted at 1330. The signal is received by a receiver that decodes the transmitted signal at 1340. Here the receive template selected for mod arithmetic can be selected to maximize $d_{min}$ according to one or more methods and/or techniques described above (for example, using one or more of the receiver templates described and illustrated herein). Further processing of the received signal may also take place in the receiver, as will be appreciated by those skilled in the art.

Figure 14:
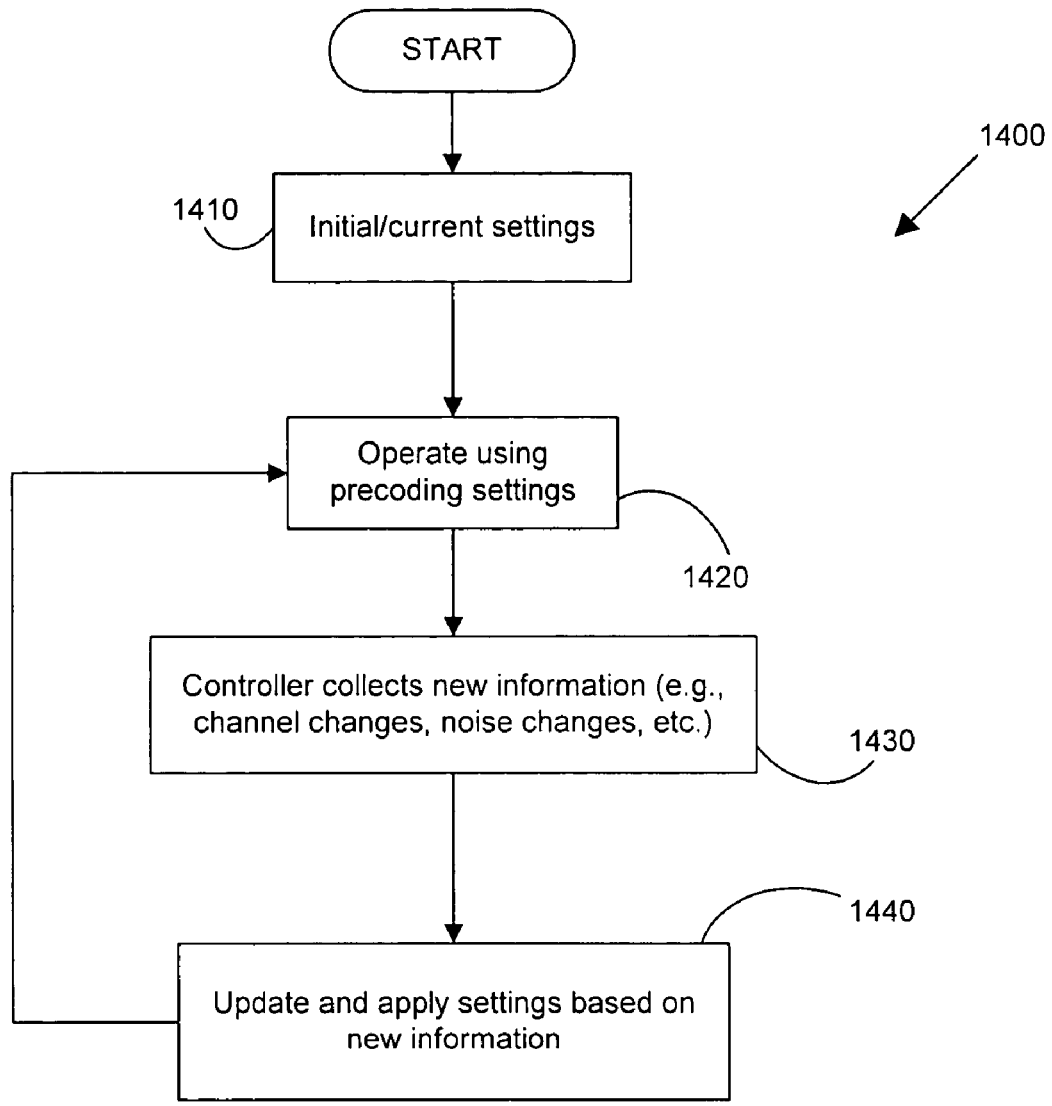
FIG. 14 is a flow diagram implementable as a method or software implementing adaptable preceding according to one or more embodiments of the present invention.

Another method 1400 according to one or more embodiments of the present invention is shown in FIG. 14. An adaptive DSL precoder (or, for example, preceding software or the like) is configured using initial or current settings at 1410. After operation 1420, a controller or the like collects new information (for example, channel changes, noise changes, etc.) at 1430. This newly collected information is used to update operational settings and apply any new settings to the adaptive precoder at 1440, after which the system operates at 1420 using the settings. Again, as noted above, the frequency with which information is collected and settings updated depends on the system and its characteristics, as will be appreciated by those skilled in the art. Therefore, any suitable timing scheme for updating the adaptive precoder can be used.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 15:
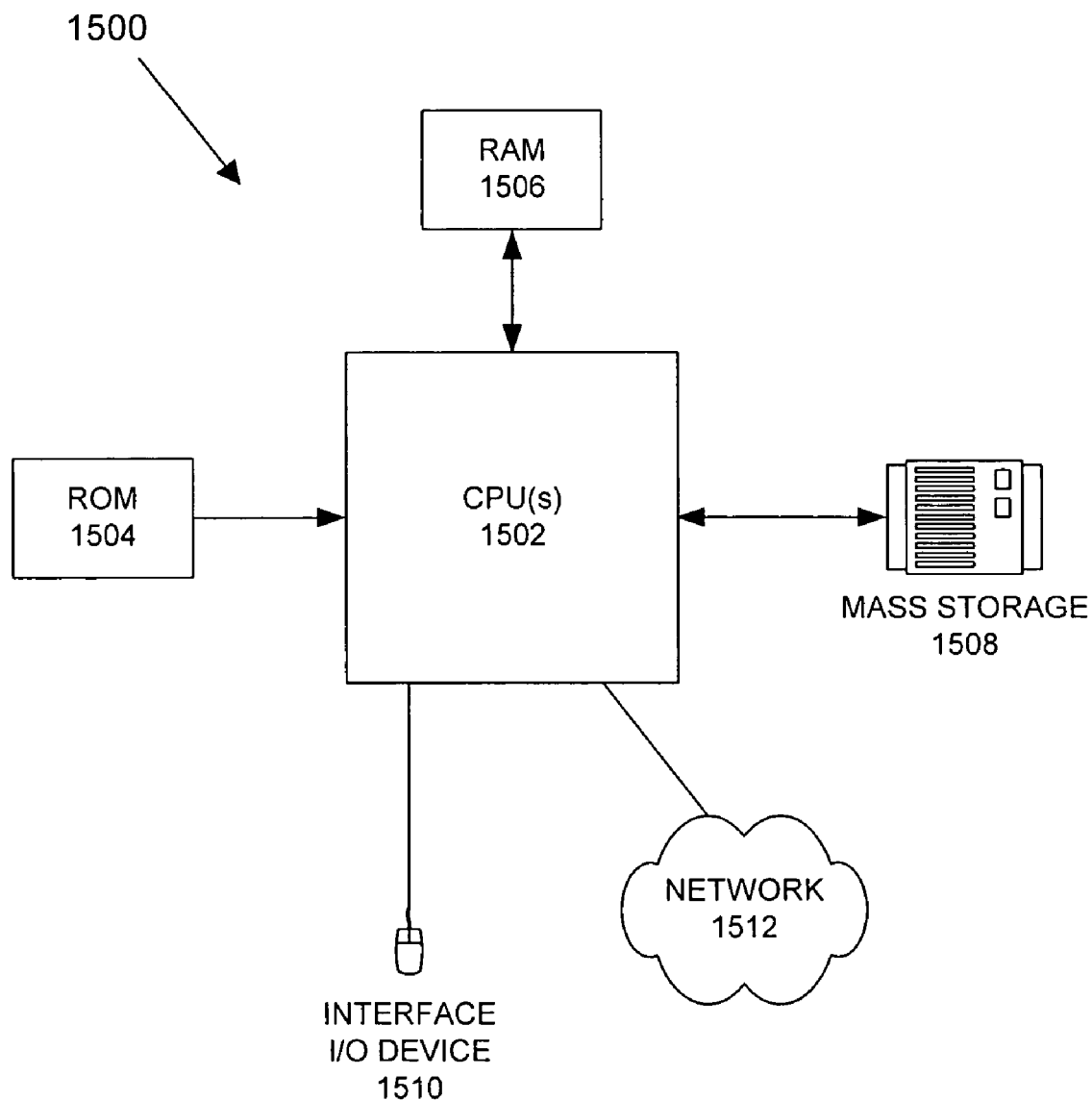
FIG. 15 is a block diagram of a typical computer system or integrated circuit system suitable for implementing embodiments of the present invention.

FIG. 15 illustrates a typical computer system that can be used by a user and/or controller in accordance with one or more embodiments of the present invention. The computer system 1500 includes any number of processors 1502 (also referred to as central processing units, or CPUs) that are coupled to storage devices including primary storage 1506 (typically a random access memory, or RAM), primary storage 1504 (typically a read only memory, or ROM). As is well known in the art, primary storage 1504 acts to transfer data and instructions uni-directionally to the CPU and primary storage 1506 is used typically to transfer data and instructions in a bi-directional manner. Both of these primary storage devices may include any suitable of the computer-readable media described above. A mass storage device 1508 also is coupled bi-directionally to CPU 1502 and provides additional data storage capacity and may include any of the computer-readable media described above. The mass storage device 1508 may be used to store programs, data and the like and is typically a secondary storage medium such as a hard disk that is slower than primary storage. It will be appreciated that the information retained within the mass storage device 1508, may, in appropriate cases, be incorporated in standard fashion as part of primary storage 1506 as virtual memory. A specific mass storage device such as a CD-ROM 1514 may also pass data uni-directionally to the CPU.

CPU 1502 also is coupled to an interface 1510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1502 optionally may be coupled to a computer or telecommunications network using a network connection as shown generally at 1512. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 1508 or 1514 and executed on CPU 1502 in conjunction with primary memory 1506. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method for compensating crosstalk by adaptively precoding data for transmission over a channel in a Digital Subscriber Line (DSL) system, the method comprising:
   providing first encoded data of a first user as a first input to a multi-user precoder;
   providing second encoded data of a second user as a second input to the multi-user precoder;
   collecting over time, via a controller, channel information including channel changes and noise changes;
   collecting over time, via the controller, information about users in the DSL system including addition of a new user and dropping off an old user;
   adaptively precoding via joint processing on the first and the second encoded data via an adaptive precoding matrix of the multi-user precoder to generate first and second precoded data from the first and second encoded data respectively, the adaptive precoding based on the channel information and on the information about the users in the DSL system,
   wherein the controller is configured to adapt the adaptive precoding matrix by matching channel changes observed over time, wherein the controller is further configured to adapt the adaptive precoding matrix to changes in a noise spatial correlation of the channel, and
   wherein the controller is further configured to update the adaptive precoding matrix in response to the addition of the new user in the DSL system or in response to the dropping off of the old user from the DSL system; and
   transmitting the first precoded data and the second precoded data over the channel.

2. The method of claim 1, wherein adaptively precoding the first encoded data and the second encoded data comprises applying a matrix-Q filter to the first encoded data and the second encoded data to generate the first precoded data and the second precoded data respectively, and wherein the matrix-Q filter is updated, based on the channel information collected by the controller, to account for changes in the DSL system.

3. The method of claim 1, wherein adaptively precoding the first encoded data and the second encoded data comprises:
   applying a user-variable feedback filter to the first encoded data and the second encoded data to generate filtered data; and
   applying a matrix-Q filter to the filtered data to generate the first precoded data and the second precoded data,
   wherein at least one of the following is updated, based on the channel information collected by the controller, to account for changes in the DSL system:
   the user-variable feedback filter, and
   the matrix-Q filter.

4. The method of claim 1, wherein adaptively precoding the first encoded data and the second encoded data comprises:
   applying a user-variable feedback filter to the encoded data to generate filtered data;
   performing modulo arithmetic on the filtered data to generate wrapped data; and
   applying a matrix-Q filter to the wrapped data to generate the first precoded data and the second precoded data,
   wherein at least one of the following is updated, based on the channel information collected by the controller, to account for changes in the DSL system:
   the user-variable feedback filter,
   the matrix-Q filter, and
   the modulo arithmetic.

5. The method of claim 1, wherein adaptively precoding the first encoded data and the second encoded data comprises:
   applying a user-variable feedback filter to the encoded data to generate filtered data;
   applying a dither signal to the filtered data to generate randomized data;
   performing modulo arithmetic on the randomized data to generate wrapped data; and
   applying a matrix-Q filter to the wrapped data to generate the first precoded data and the second precoded data,
   wherein at least one of the following is updated, based on the channel information collected by the controller, to account for changes in the DSL system:
   the user-variable feedback filter,
   the matrix-Q filter,
   the modulo arithmetic, and
   the dither signal.

6. The method of claim 1, wherein adaptively precoding the first encoded data and the second encoded data comprises dynamically precoding the first encoded data and the second encoded data by applying a user-variable feedback filter to the encoded data to generate the first precoded data and the second precoded data only when the first precoded data and the second precoded data would violate a power limitation.

7. The method of claim 6, wherein the power limitation is one of:
   a maximum transmit power, or
   an average transmit power.

8. The method of claim 4, wherein the modulo arithmetic is applied by reducing the transmit power of the first precoded data and the second precoded data.

9. The method of claim 1 further comprising:
   ordering data on a plurality of DSL lines in the DSL system for a sequence in which the data will be precoded, wherein the ordering comprises:
   precoding the data bound for receivers that do not use subtraction-only precoding or mod-enabled precoding;

precoding the data bound for receivers that use subtraction-only precoding; and precoding the data bound for receivers that use mod-enabled precoding.

10. The method of claim 1 further comprising:
receiving at a single-user receiver one of the first precoded data and the second precoded data transmitted over the channel.

11. The method of claim 6, wherein the power limitation is violated when a ratio of signal power to crosstalk power exceeds a power ratio threshold.

12. The method of claim 10, wherein the single-user receiver includes a modulo arithmetic for maximizing a detection constellation $d_{min}$ during detection in the single-user receiver.

13. The method of claim 12, wherein precoding the first encoded data and the second encoded data to generate the first precoded data and the second precoded data further comprises adding a dither signal prior to performing modulo arithmetic in the transmitter, and
wherein the dither signal is removed from the single-user receiver prior to performing a modulo arithmetic in the single-user receiver.

14. A Digital Subscriber Line (DSL) apparatus comprising:
a multi-user adaptive precoder to compensate crosstalk on a channel coupled with the DSL apparatus; and
a controller coupled with the multi-user adaptive precoder to collect over time channel information from the channel including channel changes and noise changes, and to collect information about users in the DSL system including addition of a new user and dropping off an old user,
wherein the controller to adaptively precode via joint processing on the first and the second encoded data via an adaptive precoding matrix of the multi-user precoder to generate first and second precoded data from the first and second encoded data respectively, the adaptive precoding based on the channel information and on the information about the users in the DSL system,
wherein the controller is configured to adapt the adaptive precoding matrix by matching channel changes observed over time
wherein the controller is further configured to adapt the adaptive precoding matrix to changes in a noise spatial correlation of the channel, and
wherein the controller is further configured to update the adaptive precoding matrix in response to the addition of the new user in the DSL system or in response to the dropping off of the old user from the DSL system.

15. The DSL apparatus of claim 14, wherein the controller updates a multi-user matrix-Q filter of the multi-user adaptive precoder.

16. The DSL apparatus of claim 14, wherein the multi-user adaptive precoder comprises:
a multiplication unit having an input and an output, wherein the multiplication unit to apply a multi-user matrix-Q filter to a data signal provided at the multiplication unit input to generate a precoded data signal at the multiplication unit output; and
a subtraction unit having an output coupled with the multiplication unit input, wherein the subtraction to apply a multi-user variable feedback filter to an encoded data signal at the subtraction unit input to generate a filtered data signal at the subtraction unit output.

17. The DSL apparatus of claim 16, wherein the controller disables the subtraction unit when a power condition is violated by application of the multi-user variable feedback filter to the encoded data signal.

18. The DSL apparatus of claim 16 further comprising:
a mod operator having an input coupled with the subtraction unit, wherein the mod operator to apply modulo arithmetic to the filtered data signal to reduce transmit power and generate a wrapped data signal at an output of the mod operator.

19. The DSL apparatus of claim 18 further comprising:
a dither signal generator coupled with the subtraction unit and the mod operator, wherein the dither signal generator to insert a dither signal into the filtered data signal prior to application of modulo arithmetic by the mod operator.

20. The DSL apparatus of claim 14, further comprising:
a transmitter to transmit the first precoded data and the second precoded data over the channel.

21. The DSL apparatus of claim 14, wherein the adaptive precoding matrix is repeatedly adapted by the controller to match the changes in noise observed on the channel over time.

22. The DSL apparatus of claim 14, wherein the adaptive precoding matrix is repeatedly adapted by the controller to match the changes in noise observed on the channel over time based on the updated coefficient values received by the controller.

23. The DSL apparatus of claim 14, wherein the DSL apparatus comprises a multi-user vectored DSL apparatus.

24. The method of claim 1, wherein the adaptive precoding matrix is repeatedly adapted by the controller to match the channel changes over time.

25. The method of claim 1, wherein the adaptive precoding matrix is repeatedly adapted by the controller to match the changes in noise observed on the channel over time based on the updated coefficient values received by the controller.

26. The method of claim 1, wherein the DSL system comprises a multi-user vectored DSL system.

27. The method of claim 1, wherein the adaptations to the adaptive precoding matrix comprise employing matrix-dense vector multiplication techniques which derive computational savings through exploiting triangular matrix properties observed within the adaptive precoding matrix, the triangular matrix properties comprising the adaptive precoding matrix having some of its elements equal to zero (0) or sufficiently close to zero (0).

28. The method of claim 4, wherein the modulo arithmetic is applied by minimizing the transmit power of the first precoded data and the second precoded data.

* * * * *